US008782184B2

(12) United States Patent
Furlong et al.

(10) Patent No.: US 8,782,184 B2
(45) Date of Patent: Jul. 15, 2014

(54) METHOD AND SYSTEM FOR ADAPTIVE DELIVERY OF DIGITAL MESSAGES

(71) Applicant: Message Systems, Inc., Columbia, MD (US)

(72) Inventors: Wesley J. Furlong, San Mateo, CA (US); George Schlossnagle, Woodbine, MD (US); Todd Miller, Baltimore, MD (US)

(73) Assignee: Message Systems, Inc., Columbia, MD (US)

( * ) Notice: Subject to any disclaimer, the term of this patent is extended or adjusted under 35 U.S.C. 154(b) by 0 days.

(21) Appl. No.: 14/032,899

(22) Filed: Sep. 20, 2013

(65) Prior Publication Data

US 2014/0025763 A1   Jan. 23, 2014

Related U.S. Application Data

(63) Continuation-in-part of application No. 13/079,449, filed on Apr. 4, 2011.

(51) Int. Cl.
*G06F 15/177* (2006.01)
*H04L 12/58* (2006.01)

(52) U.S. Cl.
CPC .............. *H04L 51/12* (2013.01); *H04L 12/585* (2013.01); *H04L 12/5855* (2013.01)
USPC .......................................................... 709/221

(58) Field of Classification Search
CPC . H04L 41/50; H04L 41/0813; H04L 41/0816; H04L 41/0823
USPC ........................................................... 709/221
See application file for complete search history.

(56) References Cited

U.S. PATENT DOCUMENTS

| | | | |
|---|---|---|---|
| 7,536,439 B1 | 5/2009 | Jaladanki et al. | |
| 7,698,462 B2 * | 4/2010 | McQuillen et al. | 709/238 |
| 7,870,200 B2 * | 1/2011 | Slater et al. | 709/206 |
| 8,077,699 B2 * | 12/2011 | Pearson et al. | 370/351 |
| 8,171,159 B2 | 5/2012 | McQuillen et al. | |
| 8,250,132 B2 | 8/2012 | Adreon et al. | |
| 8,312,454 B2 * | 11/2012 | Kirton et al. | 718/100 |
| 2004/0107286 A1 * | 6/2004 | Larson et al. | 709/229 |
| 2006/0059238 A1 * | 3/2006 | Slater et al. | 709/206 |
| 2009/0287801 A1 * | 11/2009 | Hartung | 709/220 |
| 2010/0250477 A1 | 9/2010 | Yadav | |
| 2013/0258891 A1 * | 10/2013 | Egan et al. | 370/252 |

* cited by examiner

*Primary Examiner* — Jerry Dennison
(74) *Attorney, Agent, or Firm* — Larry J. Guffey; Oliver & Grimsley, LLC

(57) ABSTRACT

A system and method for automatically adapting digital message traffic flow evaluates message delivery disposition, latency and performance metrics such that the system operates more optimally in terms of both overall throughput as well as with respect to system sending reputation. Reputation is in the context of maintaining message flow within limits that are acceptable for a given destination, such that the sender behavior avoids being flagged as abusive or otherwise undesirable.

20 Claims, 22 Drawing Sheets

Prior Art: Traditional Message Delivery Workflow

Prior Art: Traditional Message Disposition Processing
Applies to both Success and Failure Dispositions Adaptive Delivery Workflow Adaptive Message Disposition Processing
Applies to both Success and Failure Dispositions

METHOD AND SYSTEM FOR ADAPTIVE DELIVERY OF DIGITAL MESSAGES

CROSS-REFERENCE TO RELATED APPLICATION

This is a continuation-in-part application that claims priority to the U.S. regular patent application Ser. No. 13/079,449, which was filed on Apr. 4, 2011, and to the U.S. provisional patent application No. 61/320,619 that was filed Apr. 2, 2010, both of which were filed by the present inventors. The entire disclosures of these priority documents are incorporated herein by reference.

BACKGROUND OF THE INVENTION

1. Field of the Invention

The present invention relates to methods and systems for controlling delivery of digital messages such as E-mails transmitted via networks of computer systems.

2. Description of the Related Art

Transmission of information in the form of digital messages over computer communication networks such as e-mail and text messages is an essential component of modern lives, in both business and leisure. Many businesses derive income from services built "on top of" digital messaging. For example, almost all online purchases trigger a message to confirm that a monetary transaction has taken place. Schools are increasingly making use of alerting services that broadcast text messages to mobile devices. Businesses use E-mail and instant messaging as an essential part of day-to-day business communication, both internally and externally. Internet Service Providers ("ISPs") enable email services for personal and business use. E-mail Service Providers ("ESPs") enable other businesses to efficiently send their marketing and other types of communication without requiring a significant investment in sending infrastructure. "Aggregators" provide gateways to text messaging protocols and act as an endpoint for submitting Short Message Service ("SMS") and Multimedia Message Service ("MMS") messages to cell phone provider networks.

Many digital messaging systems that send digital messages over the Internet use protocols such as Simple Mail Transfer Protocol ("SMTP"), in the case of E-mail, and other protocols when the digital message is other than e-mail, to send digital messages from one server to another. The messages can then be retrieved with a client using services such as Post Office Protocol ("POP") or Internet Message Access Protocol ("IMAP"). Other protocols for sending digital messages that are e-mails include, but are not limited to, POP3, X.400 International Telecommunication Union standard (X.400), and the Novell message handling service ("MHS") as well as the Extended Simple Mail Transfer Protocol ("ESMTP"). Examples of prior art message delivery systems are illustrated in FIGS. 1A, 1B, 1C and 2.

SMTP transports digital messages among different hosts within the Transmission Control Protocol/Internet Protocol ("TCP/IP"). Under SMTP, a client SMTP process opens a TCP connection to a server SMTP process on a remote host and attempts to send mail across the connection. The server SMTP process listens for a TCP connection on a selected port and the client SMTP process initiates a connection on the selected port. When the TCP connection is successful, the two processes execute a simple request-response dialogue, defined by the SMTP protocol, during which the client process transmits the mail addresses of the originator and the recipient(s) for a message. When the server process accepts these mail addresses, the client process transmits the e-mail instant message. The e-mail message contains a message header and message text ("body") formatted in accordance with RFC 822 STD 11, the Standard for the format of Internet Text Messages. Mail that arrives via SMTP is forwarded to a remote server or it is delivered to mailboxes on the local server. Similar protocols are used for other digital message formats (i.e., other than e-mail).

The SMTP protocol (see, e.g., RFC 821 or the recently updated standard RFC5321) supports both end-to-end (no intermediate message transfer agents "MTAs") and store-and-forward mail delivery methods. The end-to-end method is used between organizations, and the store-and-forward method is chosen for operating within organizations that have TCP/IP and SMTP-based networks. A SMTP client will contact the destination host's SMTP server directly to deliver the mail. It will keep the mail item from being transmitted until it has been successfully copied to the recipient's SMTP.

This is different from the store-and-forward principle that is common in many other electronic mailing systems, where the mail item may pass through a number of intermediate hosts in the same network on its way to the destination and where successful transmission from the sender only indicates that the mail item has reached the first intermediate hop. The RFC 821 standard defines a client-server protocol. The client SMTP is the one which initiates the session (that is, the sending SMTP) and the server is the one that responds (the receiving SMTP) to the session request. Because the client SMTP frequently acts as a server for a user-mailing program, however, it is often simpler to refer to the client as the sender-SMTP and to the server as the receiver-SMTP. An SMTP-based process can transfer electronic mail to another process on the same network or to another network via a relay or gateway process accessible to both networks. An e-mail message may pass through a number of intermediate relay or gateway hosts on its path from a sender to a recipient.

An example of the components of an SMTP system is illustrated in FIG. 1A. Systems that send digital messages other than e-mail have similar components. Referring to FIG. 1A, users deal with a user agent ("UA", e.g., 120 and 160). The user agents for Windows™ include Microsoft Outlook™. The exchange of e-mail using, for example, TCP, is performed by a Message Transfer Agent ("MTA" e.g., 140 or 150). The user's local MTA maintains a mail queue so that it can schedule repeat delivery attempts in case a remote server is unable. Also the local MTA delivers mail to mailboxes, and the information can be downloaded by the UA (see FIG. 1A). The SMTP protocol defines a mechanism of communication between two MTAs across a single TCP connection. As a result of a user mail request, the sender-SMTP establishes a two-way connection with a receiver-SMTP. The receiver-SMTP can be either the ultimate destination or an intermediate one (known as a mail gateway). The sender-SMTP will generate commands, which are replied to by the receiver-SMTP (see FIG. 1C).

A typical e-mail delivery process is as follows. Delivery processes for digital messages other than e-mail follow similar scenarios. In the following scenario, a sending user at terminal 100 sends an e-mail message to a recipient user at an e-mail address: recipient@example.org. Recipient can review that e-mail message at terminal 170. Recipient's ISP uses mail transfer agent MTA 150.

Initially, the sending user composes the message and actuates or chooses "send" using mail user agent (MUA) 120. The sending user's e-mail message identifies one or more intended recipients (e.g., destination e-mail addresses), a subject heading, and a message body, and may specify one or more attachments.

Next, MUA 120 queries a DNS server (not shown) for the IP address of the local mail server running MTA 140. The DNS server translates the domain name into an IP address of the local mail server and User agent 120 opens an SMTP connection to the local mail server running MTA 140. The message is transmitted to the local mail server using the SMTP protocol. An MTA (also called a mail server, or a mail exchange server in the context of the Domain Name System) is a computer program or software agent that transfers electronic mail messages from one computer to another. The message is transmitted to MTA 150 from MTA 140 using the SMTP protocol over a TCP connection.

The recipient user at terminal 170 has user agent 160 download recipient's new messages, including the sending user's e-mail message. The recipient's MTA 150 is responsible for queuing up messages and arranging for their distribution. MTA 150 "listens" for incoming e-mail messages on the SMTP port, and when an e-mail message is detected, it handles the message according to configuration settings or policies chosen by the system administrator. Those policies can be defined in accordance with relevant standards such as Request for Comment documents (RFCs). Typically, the mail server or MTA must temporarily store incoming and outgoing messages in a queue, known as a the "mail queue." Actual size of the mail queue is highly dependent on one's system resources and daily message volumes.

In some instances, referring to FIG. 1B, communication between a sending host (client) and a receiving host (server), could involve a process known as "relaying". In addition to one MTA at the sender site and one at the receiving site, other MTAs, acting as client or server, can relay the electronic mail across the network. This scenario of communication between the sender and the receiver can be accomplished through the use of a digital message gateway, which is a relay MTA that can receive digital messages prepared by a protocol other than SMTP and transform it to the SMTP format before sending it. The digital message gateway can also receive digital messages in the SMTP format, change it to another format, and then send it to the MTA of the client that does not use the TCP/IP protocol suite. In various implementations, there is the capability to exchange mail between the TCP/IP SMTP mailing system and the locally used mailing systems. These applications are called digital message gateways or mail bridges. Sending digital messages (e.g., e-mail) through a digital message gateway may alter the end-to-end delivery specification, because SMTP will only guarantee delivery to the mail-gateway host, not to the real destination host, which is located beyond the TCP/IP network. When a digital message gateway is used, the SMTP end-to-end transmission is host-to-gateway, gateway-to-host or gateway-to-gateway; the behavior beyond the gateway is not defined by SMTP.

Existing digital message sending systems are sometimes unsatisfactory. Digital messages (e.g., e-mail) sent to a given domain (e.g., a particular ISP) or site may be blocked. However, typically, the blocking domain will either not specify why the digital message was blocked or will provide incomplete information as to why the message was blocked. In one example, the reason why a domain will block incoming digital messages is that a digital message quota, where the quota is based for example on a number of allowed digital messages per unit of time (e.g., per day, per week, per month) from the sending domain has been exceeded. However, the conventional sending digital messaging sending system (e.g., MTA 140 of FIG. 1A) does not learn that a quota has been exceeded from the message failure notices that are returned to the sending MTA by the blocking domain. So the digital message sending system continues to resend the blocked digital messages and send any new additional digital messages (e.g., e-mail, text messages, etc.) in its queue to the blocking domain even though there is no chance that the blocking domain will accept the resent digital messages or the new digital messages from the digital message sending system because the quota has been exceeded.

In another example, the receiving domain may be down because of equipment failure or scheduled maintenance. There are, therefore, many reasons why a digital message sending system may send digital messages to the receiving domain and meet with failure. But the digital message sending system will continue to resend the digital message and any new digital message in its queue to the receiving domain on some predetermined retry basis without intelligently backing off from its efforts to send out the digital message to the domain that is down.

It is reported that the majority of E-mail traffic (in excess of 80-90%, depending on the source of the statistics) is classified as "Spam" (unsolicited or otherwise unwanted messages). It is increasingly difficult for both senders and receivers to ensure that E-mail messages arrive successfully at the intended recipient's inbox. This is due in part to a pessimistic stance being adopted by the receivers; their inbound systems are burdened with the task of accurately classifying and processing messages that may have Spam, Virus or Phishing content and E-mail receivers are fighting a constant battle with the increasing volume of unwanted messages and trying to balance that with an increasing cost in infrastructure to deal with that load. This has resulted in systems programmed to implement a set of incoming E-mail processing policies that penalize bulk senders by throttling back reception rates or delaying inbound mail reception, making it difficult for their E-mail to reach the inbox on-time if ever. These receiver policies result in "Deliverability Issues" for the senders; not only is delivery slowed down, but it is often done in such a way that makes it difficult for the sending system to take appropriate action.

Many smaller E-mail sending sites resort to tricks at the firewall that result in traffic mysteriously stopping, rather than sending back a definitive response code. This tactic is aimed at illegitimate senders where it is effective at avoiding load, but is especially harmful to legitimate senders because it increases the resource utilization of the sending system by making the sending system try harder to deliver the messages. The slowdown in reception causes a bottleneck on the sending system that increases resource utilization and CPU load, and can in turn have an impact on the sending rates for mail intended for other destinations.

If a sender is seen to trigger enough of these receiver policies, the sender may have their sending IP address placed on a "blacklist" shared with other recipient domains. Blacklisting causes the triggering sender to have deliverability issues at other receiving sites too. The result of these conditions is that it is difficult for a legitimate bulk sender to achieve high throughput without establishing some kind of relationship, either directly or indirectly through a "deliverability expert", with the administrators for the domains to which they intend to deliver their mail. Such a relationship will enable the sender to determine traffic shaping parameters or rules that are acceptable to the recipient and are typically dependent on the volume of messages being sent over an extended period of time and the historical and ongoing reputation of the sender (e.g., is this sender a known spammer, or does this sender otherwise have a high complaint rate from the ultimate recipients?). Other factors may apply; the inbound mail policies are not necessarily public and, by necessity, the policies change over time.

Having established appropriate traffic shaping parameters or rules for a given recipient domain, the sender's software can be configured to respect those rules. As the rules change, the software configuration will also need to be adjusted accordingly. This is an ongoing support burden for both the sender and the receiver of messages. Even with the correct shaping rules in place, it is possible for a sender to trip up and damage their reputation.

Many senders re-sell their services to others and act as Email Service Providers (ESPs). It is possible for an ESP customer to send a batch of e-mail that is widely regarded as spam; if enough of this content is sent through the ESP system it can result in blacklisting the system and impact the mail throughput for other customers of that ESP. A diligent administrator at an ESP should be able to monitor and take action in the aforementioned case, but would need to be very focused on that task to be effective.

While much of this document refers to E-mail, the same principles and problems apply to all digital messaging protocols and platforms; text messaging (SMS), multimedia messaging (MMS), instant messaging (XMPP and other proprietary protocols). Popular social media platforms, such as Twitter.sup$^{SM}$ and Facebook.sup$^{SM}$ also expose messaging interfaces for external applications to similar problems.

There is a need, therefore, for a convenient, flexible and effective method and system for adapting to changes and controlling delivery of digital messages such as E-mails transmitted via networks of computer systems.

BRIEF SUMMARY OF THE INVENTION

Accordingly, it is an object of the present invention to overcome the above mentioned difficulties by providing a convenient, flexible and effective method and system for adapting to changes and controlling delivery of digital messages such as E-mails transmitted via networks of computer systems.

In accordance with the present invention, the sender is provided with a method and system to adaptively maintain and supervise message traffic in a manner which helps to maintain a good reputation with receivers. The method and system of the present invention works by using a combination of:

(a) message delivery disposition information (e.g., was the delivery attempt successful, was it deferred or was it rejected outright? what reason was given?), and (b) internal system performance metrics to make adjustments to outbound traffic shaping parameters (such as message delivery rate).

The method and system of the present invention can make the decision to suspend or even abandon delivery of messages for a given recipient system based on these factors.

The present invention is not limited to purely reactive processing; an important component is knowledge of acceptable traffic parameters and the interpretation of delivery responses for well-known recipient systems. These are handled in the present invention via an adaptively updatable Rule-set that can be delivered to the sending system in an automated fashion. The present invention may be configured to generate selected alerts in the form of a digital message (email, text message, SNMP trap and so forth, as supported by the sending system), or by executing a script, in the event that the system makes an adjustment of the configuration, based on the system configuration. For example, one Sender's administrator may only wish to be notified of suspensions or abandonment and not be concerned about increases in "message send" rate, whereas another Sender's administrator may be intensely interested in all such changes effected by the system.

Additionally, the method and system of the present invention allows administrative control in the form of setting additional specific limits that act as guard rails and in the form of an administrative override for traffic suspension or abandonment (i.e., termination of the E-mail sending activity to a given receiver).

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

Figure 1A:
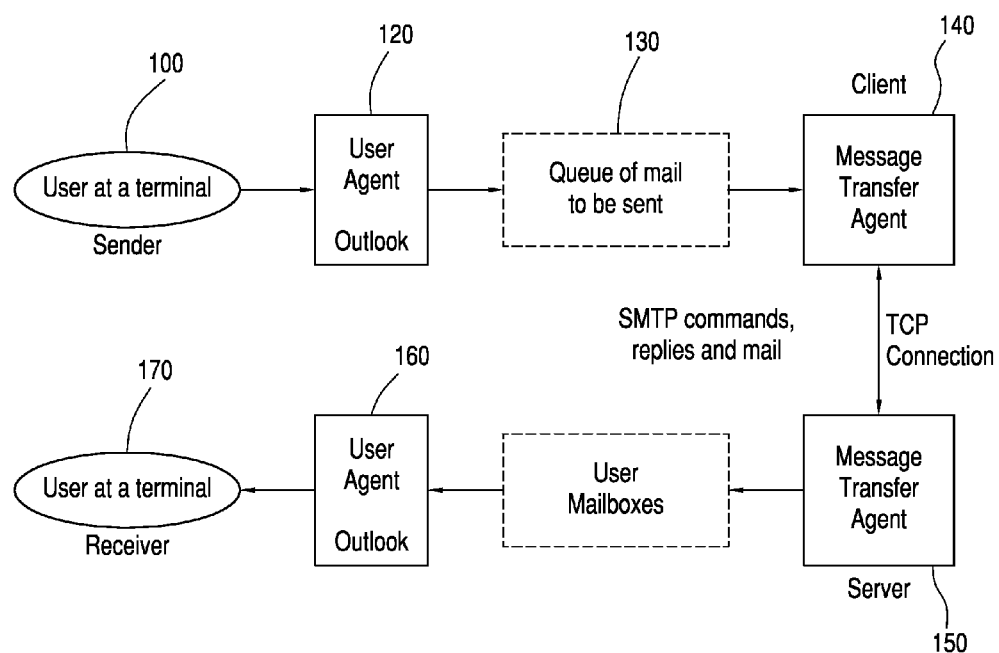
FIG. 1A is a block diagram illustrating the traditional components included in a simple SMTP communications system, in accordance with the Prior Art.

Table 1(a)-1(c) shows an example of some of the representative rules that could be found in a Rule-set of the present invention.

DETAILED DESCRIPTION OF THE INVENTION

Before explaining at least one embodiment of the present invention in detail, it is to be understood that the invention is not limited in its application to the details of construction and to the arrangements of the components set forth in the following description or illustrated in the application's drawings or figures. The invention is capable of other embodiments and of being practiced and carried out in various ways. Also, it is to be understood that the phraseology and terminology employed herein are for the purpose of description and should not be regarded as limiting.

For example, throughout the remainder of this description, when the term "per-domain" is used, it indicates some preference or behavior that is scoped to a given recipient system. For instance, when referring to email, "joe@example.com and bob@example.com" are two distinct recipients that are serviced by the same email domain (i.e., example.com). It is typically the case that the receiving system for an email domain (and indeed, for other messaging protocols) enforces the same overall reception policies at the domain level rather than for individual recipients. When this text refers to a per-domain sending rate, it indicates a rate that applies equally to all recipients at a given domain for all messages.

Additionally, when this text uses the term "per-binding-domain" it further narrows the concept of "per-domain" to scope it to a particular binding, which may be a physical binding to a network interface or address or a logical binding used to segment traffic from the perspective of the sending system, but is otherwise not able to be discerned by the recipient system. The latter case is useful more for reporting or accounting purposes of the sending system than for specific deliverability; it is included in this description for completeness.

When this text refers to a per-binding-domain sending rate, it indicates a rate that applies equally to all recipients at a given domain for messages associated with a given binding. In terms of a concrete example, a sending system may be configured with multiple bindings that map to a number of network addresses assigned to the system. Messages queued to the system by "Customer A" are bound to one of those addresses; whereas messages queued to the system by "Customer B" are bound to a different address. Messages from "Customer A" may be subject to a different per-binding-domain sending rate than those from "Customer B" based on a combination of explicit system configuration and adjustments made by this present invention. For the most part, the context of the rest of this text is "per-binding-domain" unless detailed otherwise.

The following description illustrates the method of the present invention in an exemplary context of e-mail message processing, as a means of furnishing an example, but the present invention is also applicable to all present and future digital messaging protocols, and the scope of the present invention should not be construed as being limited to these illustrative embodiments. Returning to the nomenclature:

Blackhole refers to arranging for message traffic to be failed without attempting delivery—it is a real-time, proactive action taken to avoid the problems that are expected to arise if the message were to be sent. This is treated as a permanent failure and logged as such.

Disposition refers to the result of a message delivery attempt. Messaging protocols allow for an explicit response code that indicates the degree of success, and will also provide a supplemental field to convey additional context. For example, a system may indicate a transient rejection and specify "message permanently deferred" as part of the response. In this case, the sending system should instead reclassify the response as a permanent failure.

D.S.N. or DSN refers to a Delivery Status Notification, and M.D.N. or MDN refers to a Message Disposition Notification. These are auxiliary messages generated by a relaying system in order to convey information about the disposition or status of a message delivery attempt back to the originator of the message. In normal operation these are sent to indicate that a permanent failure was encountered, but it is possible in some system configurations to notify the originator of events such as transient failure and successful delivery. Furthermore, some systems allow the sender to request additional status or disposition notification at the time of submission of a message.

Permanent Failure or Permanent Rejection refers to a message disposition that indicates that the message will never be successfully delivered. Most likely causes are either due to an invalid recipient or other receiver policy or configuration decisions that prevent the message from being accepted. The two terms are from the perspective of the sender and recipient, respectively.

Transient Failure or Transient Rejection refers to a message disposition that indicates that the message was not successfully delivered, but that trying again at some later time could result in a successful delivery. Most likely causes are due to a transient resource limitation (perhaps the system load is too high, or disk space utilization is too high), or due to greylisting. The two terms are from the perspective of the sender and recipient, respectively.

Greylisting refers to the technique of a receiving MTA issuing a transient rejection in cases where it is unsure whether it wants to accept the message. Classic greylisting is effectively a throttle scoped to a particular sender, recipient and sending IP triplet (see, e.g.: http://projects.puremagic.com/greylisting/whitepaper.html), but some sites employ a statistical mechanism whereby a given send attempt has a chance of triggering the greylisting response.

Figure 1B:
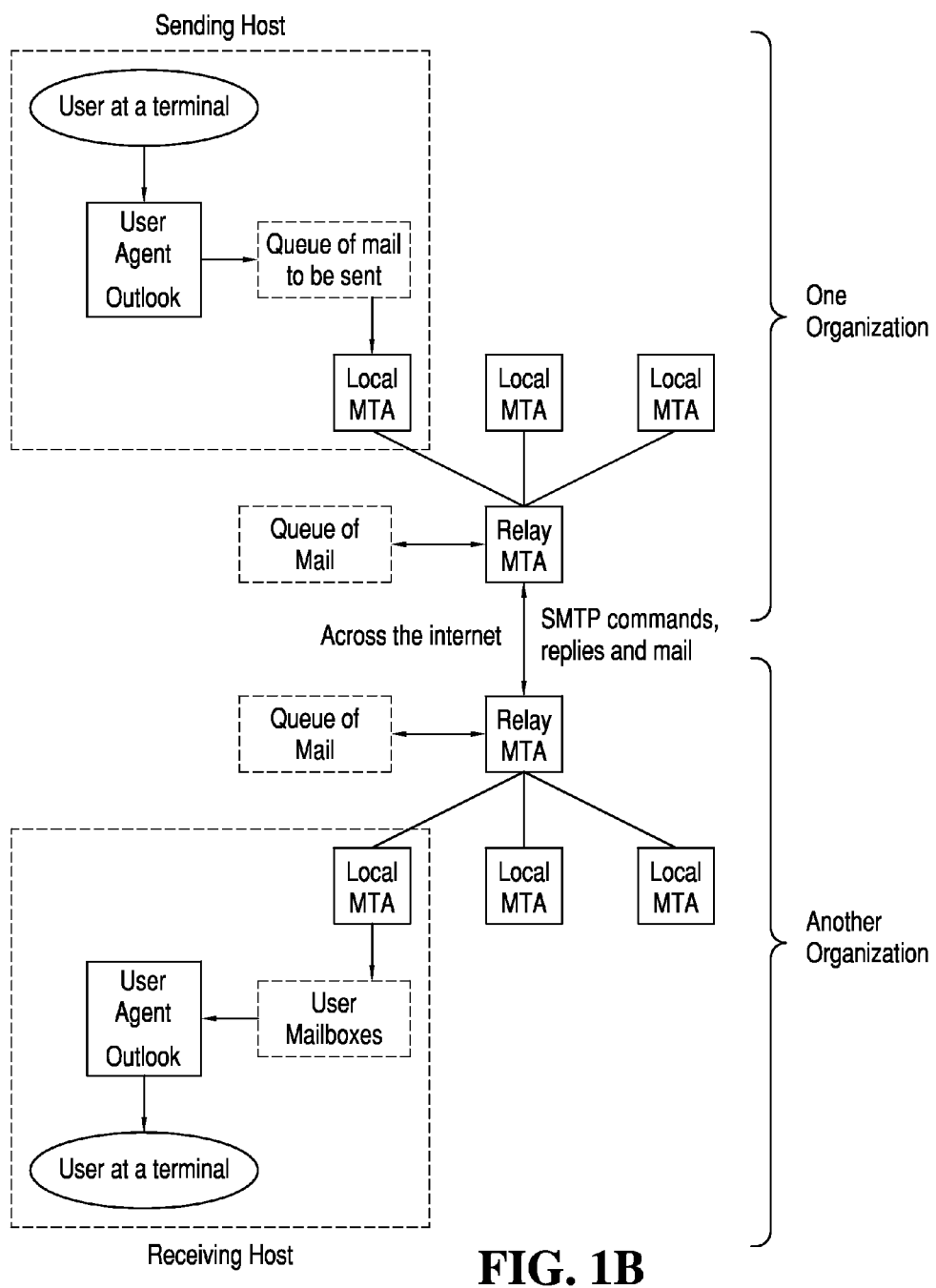
FIG. 1B is a block diagram illustrating the components often included in a Relay MTA connected SMTP communications system, in accordance with the Prior Art.
Figure 1C:
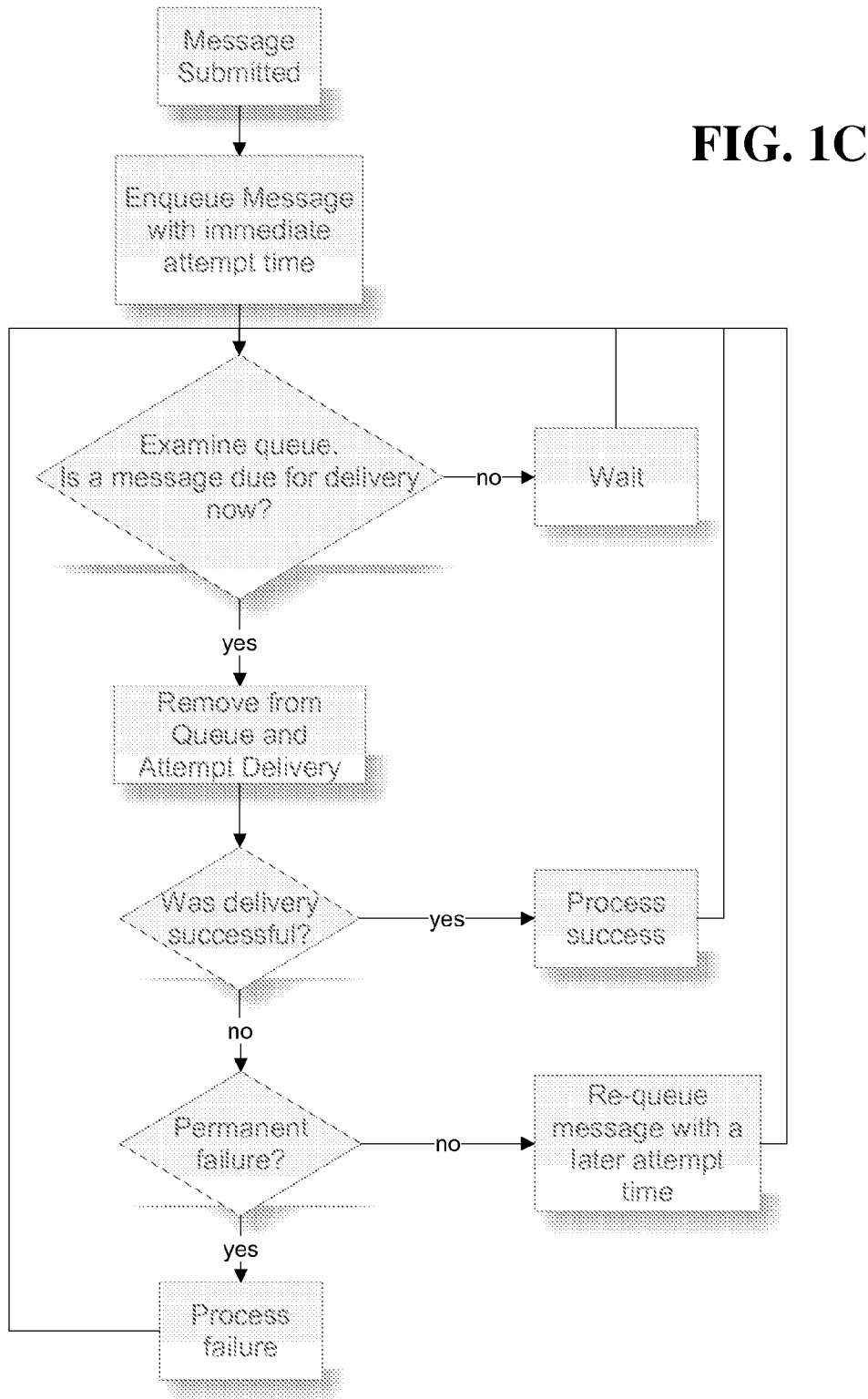
FIG. 1C is a flow chart illustrating Traditional Message Delivery Workflow, and shows the steps that are taken by a sending system in delivering digital messages, in accordance with the Prior Art.
Figure 3:
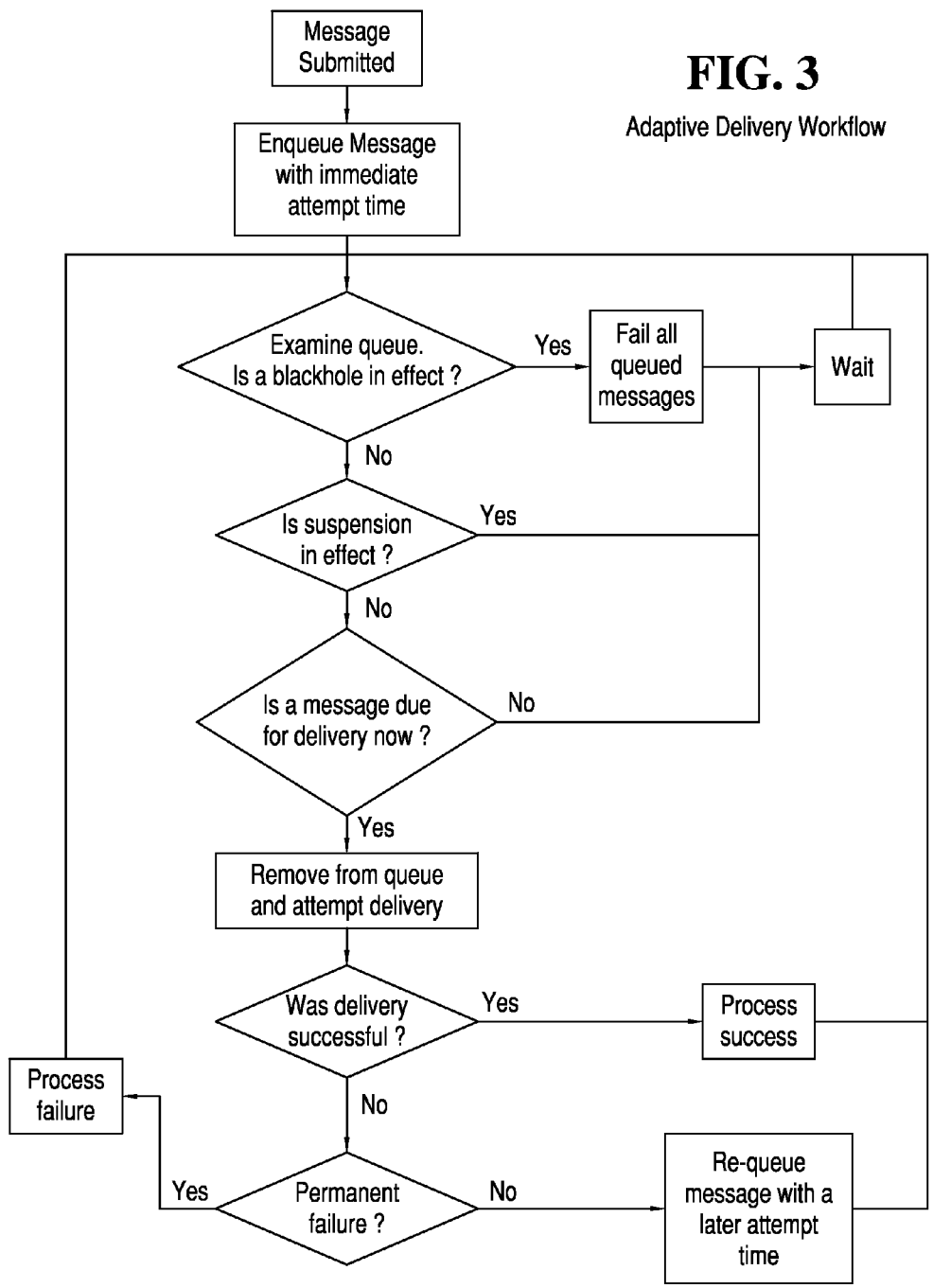
FIG. 3 is a flow chart illustrating Adaptive Delivery Workflow in accordance with the present invention, and should be contrasted with the process illustrated in FIG. 1C to illustrate changes in delivery workflow in the present invention.

Turning now to FIG. 3, it illustrates the Adaptive Delivery Workflow and should be contrasted with the process illustrated in FIG. 1C to illustrate changes in delivery workflow in the present invention. In the context of Applicant's invention, when Applicant has decided that it would be beneficial to do so, Applicant may set the status for a queue to be "blackhole". The steps taken for this are:

1. Record the blackhole status and expiration time in the adaptive delivery data store,
2. Send a notification to the administrator that a blackhole has been enacted,
3. For each message currently in the queue that has been set to blackhole:
   Record a failure due to blackhole to the appropriate logs,
   Remove the message from the spool.
4. During reception of new messages into the system, the system will inspect the blackhole status for the queue that will be used. If the queue status is set to blackhole, and the blackhole period has not expired, instead of accepting delivery of the message, the System will reject the message and return an error message indicating that a blackhole is in effect. This allows Applicant to avoid paying costs for journaling the message to spool. Applicant also logs the rejection message to the appropriate logs. These steps mean that Applicant will not attempt delivery to the destination until the blackhole status has expired.

Figure 2:
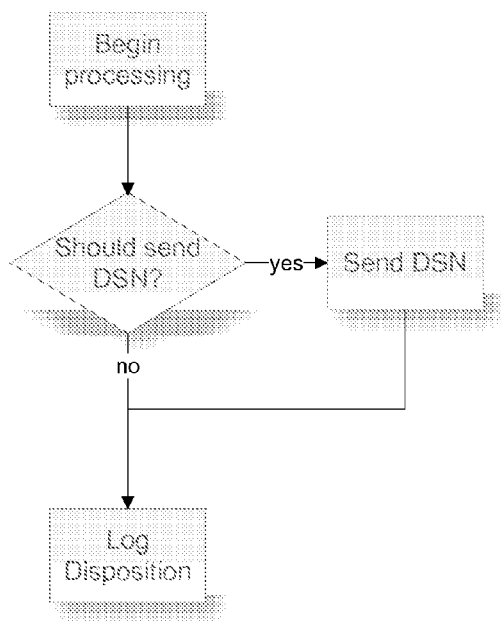
FIG. 2 is a flow chart illustrating Traditional Message Disposition Processing, and shows the steps that are taken to process both successful and failed digital message delivery attempts, in accordance with the Prior Art.
Figure 4:
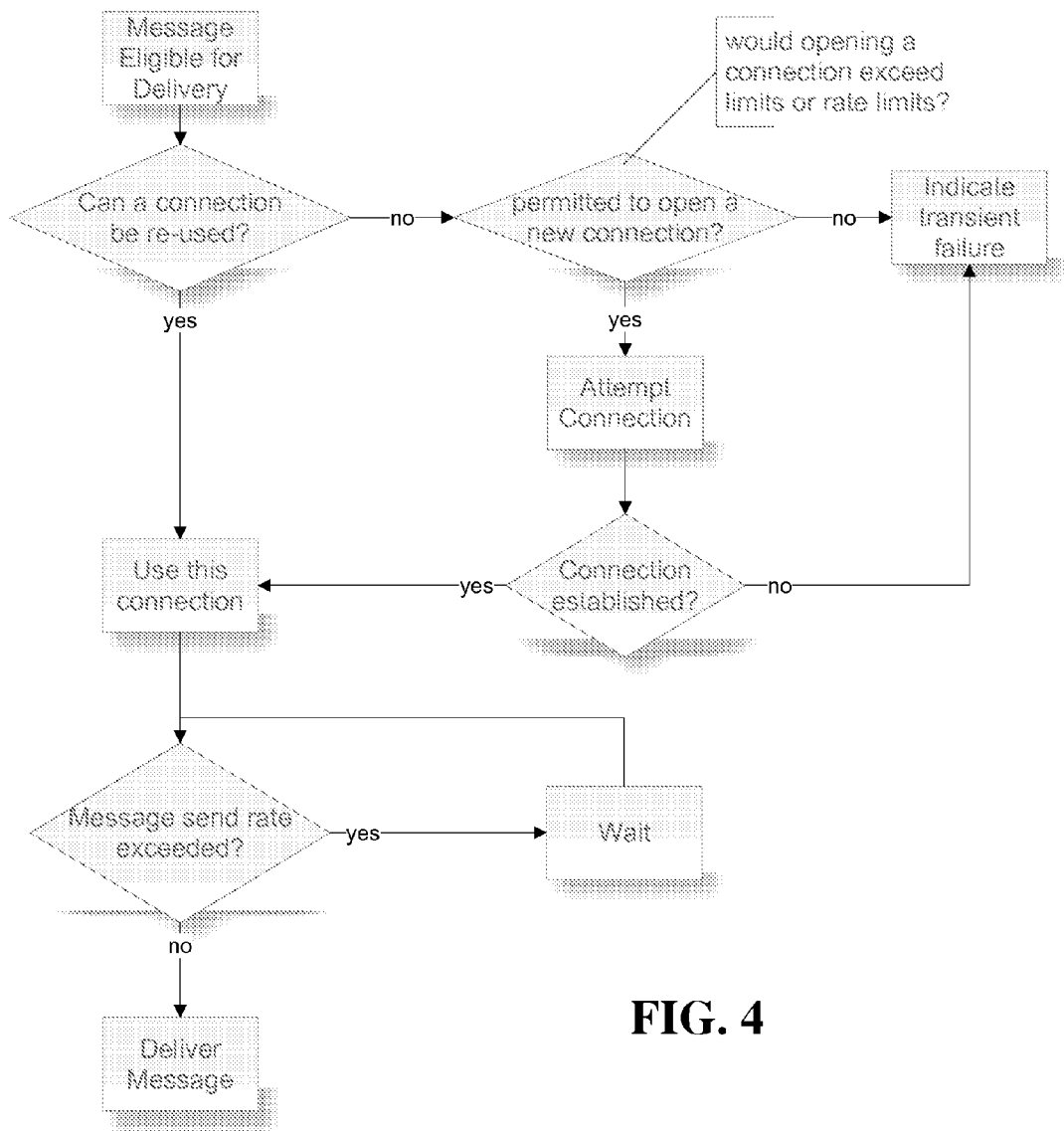
FIG. 4 is a flow chart illustrating Typical Delivery Attempt Workflow, and illustrates and expands the "Attempt Delivery" box from FIG. 1C to demonstrate some of the factors that influence the delivery processing in a sending system.
Figure 5:
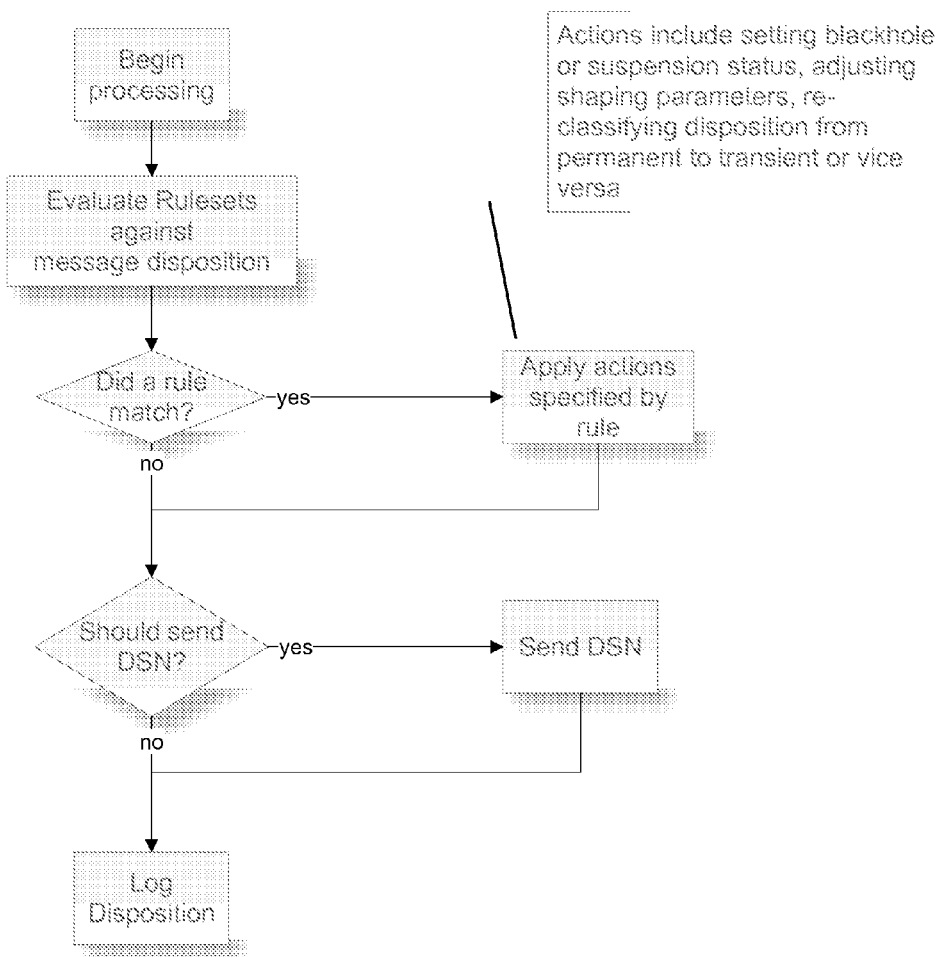
FIG. 5 is a flow chart illustrating Adaptive Message Disposition Processing in accordance with the present invention, and should be contrasted with FIG. 2 to illustrate changes in delivery workflow in the present invention.

FIG. 4 is a flow chart illustrating Typical Delivery Attempt Workflow and includes newly developed subject matter which supplements and improves upon the subject matter identified in the "Attempt Delivery" box from FIG. 1C to demonstrate some of the real-time factors that influence the delivery processing in the present invention's sending system. The "Wait" block indicates that the system is idle pending some other externally or internally triggered action. FIG. 5 is a flow chart illustrating Adaptive Message Disposition Processing and should be contrasted with FIG. 2 to illustrate changes in delivery workflow in the present invention. The figure applies selected adaptive actions specified by the matching rule; wherein the real-time, pro-active, adaptive actions may include setting a blackhole status, setting a suspension status, adjusting shaping parameters, throttling down sending rate to a selected limit, reclassifying disposition from permanent to transient or reclassifying disposition from transient to permanent.

The present invention generally relates an improved method for enabling a digital message system (i.e., of the type that sends digital messages to recipients at a plurality of recipient domains) to better respond in real-time to their inevitably encountered negative message disposition feedback so as to be able to still maintain high message delivery success rates. The present invention accomplishes this by utilizing what the applicants have discovered are the best practices or rules for automatically changing, in real-time and an ongoing manner, the operating techniques being used by the system to deliver its digital messages.

In a preferred embodiment, the present invention is a method which includes the step of establishing and using what is herein referred to as an adaptive and continuously updatable Rule-set. It directs and changes the system's operating techniques in an ongoing and real-time manner so as to immediately respond to its "unsuccessful" message disposition" feedback and even delay the sending of a message which is likely to result in a message failure.

Without the present invention, the administrators of such digital message systems have heretofore had to spend significant amounts of their time in taking a reactive approach (i.e., after monitoring the delivery status of message over a specified monitoring period) to updating their operating procedures. This often involved the task of making chances after specified monitoring periods to the traffic shaping parameters, rules, etc. which are used by such systems to control how their digital messages are sent to various recipient domains.

One of the benefits of the Rule-set of the present invention is that it automatically, without user or system administrator intervention, and on an ongoing or continual basis, as opposed to making periodic changes, performs this updating task for the administrator. Because of this "automatic and ongoing" feature of the present invention, we speak of it as providing a digital message sender with the ability to be proactive in responding to the "unsuccessful" message disposition information which digital message senders are continually receiving.

This is a significant improvement over prior systems which were only reactive in the sense that they only provided for a change to a system's traffic shaping parameters or for some other specific reactive action (e.g., deferral of all future messages) when a specified maximum limit was exceeded over a specified monitoring period for a certain system metric (e.g., message delivery failure rate). Prior systems had no ability to take proactive action to prevent the exceeding of such system specified, maximum limits.

Furthermore, the present invention can make these needed updates more accurately and quicker than the individual administrators since the present invention is configured to use the "unsuccessful" message disposition information that it receives from a multitude of both sending and recipient domains rather than the single recipient domain with which an administrator is usually dealing when trying to make decisions on how to best change its operating procedures—thus, the present invention is able to more quickly assemble a sufficient sample size on which to base its updating recommendations, and therefore better able to adapt to the feedback that digital message senders are receiving from their targeted recipient domains. For the above reasons, we often speak of the Rule-set of the present invention as being a real-time, adaptive, updatable Rule-set.

To provide the rules of the Rule-set of the present invention with as much flexibility as possible so as to enable them to optimally address the many differing situations that can be the cause for the receipt of "unsuccessful" message disposition information and to then optimally update a digital message sender's operating techniques so as to improve the sender's ability to have their messages be successfully delivered, it proves useful to define each of such rules as consisting of a number of parts, elements or properties. We define these as:

(a) a "code (e.g., Perl Compatible Regular Expression (PCRE) pattern matching means or similar tool)" that is compared against the "unsuccessful" message disposition feedback or response code to determine whether a match between them exists; if it does, this match indicates that an updating of the sender's operating techniques may be warranted based on the "unsuccessful" message disposition feedback's phase and the trigger for this code (see below); note that this code is effectively a means for assessing the "unsuccessful" message delivery disposition information so as to make a detailed assessment and decision as to whether a change in the operating techniques of the system is needed in order to ensure the continuation of the desired high message delivery success rate, (b) the "phase" or "phase metric" of the feedback—i.e., when it was that this feedback was issued by the recipient domain during the process of its receipt of the digital message (e.g., was it when the sender's system was connecting with the recipient domain or after the payload message had been delivered), (c) the triggering threshold or trigger which determines the number of times that a specific feedback has to be received before a recommended updating action will be taken (e.g. the first occurrence or the first time that it is received at a frequency of 10/second), (d) an updating actions or "action" that is in response to the matching assessment (e.g., transcode, purge, suspend, blackhole, throttle, warmup, greylisted, reduce connections, reduce deliveries—for brevity, these are just listed here and defined later in the application), and (e) a message notification or "message" (e.g., to the administrator of the email sending system) that alerts one regarding certain details (e.g., reason for the rule-updating action) of the updating action that is being taken.

These various elements of any rule of a Rule-set of the present invention are unique and, along with the computational assessment of the message disposition feedback, a key to providing the present method with its enhanced automatic, with user intervention, feedback control. All prior attempts to implement automatic feedback control have required the use of either a periodic report from the recipient domain or an input from an external system in order to initiate any automatic changing of a message delivery system's operating techniques or traffic shaping parameters or rules. The present invention requires neither of these in order to provide its automatic features—it requires only the regular "unsuccessful" message disposition information or feedback provided by the recipient domain. The code matching and triggering features of all rules allow them to make the necessary decisions or assessments as to whether responsive and automatic, updating actions should be taken without having to have any additional input from the recipient domain or any other external system.

Table 1 shows an example of some of the representative rules that could be found in a Rule-set of the present invention.

Turning now to the FIGS. of the present application, FIGS. 1A-1C illustrate the components and method steps employed in traditional E-mail transmission from a sender's terminal 100 to a recipient's terminal 170, as discussed above.

The system and method of the present invention (as illustrated in FIGS. 3-13 and 14-20) is readily implemented using traditional computing and data transmission equipment (e.g., using hardware similar to the components shown in FIGS. 1A and 1B), when programmed to perform the method steps described below. At the outset, it is helpful to define nomenclature or terminology.

The method and system of the present invention work by modifying, either directly or via a hooking or extension mechanism, a system including message sending software such that the system can monitor deliverability on a per-binding-domain basis; this is done by maintaining statistics and monitoring the responses returned from the recipient as part of the appropriate messaging protocol dialogue. The system of the present invention also hooks the traffic shaping aspects of the sending software such that it can specify the values that will be used for those shaping parameters. There are several paths by which adjustments are made to the sending system:

Time Based:

Once a minute, each "binding-domain" (sending-IP-address and recipient-domain combination) is assessed. If the proportion of bounced mail is above a configurable threshold, then it is diagnosed as having a deliverability issue and is suspended. The act of suspending the binding-domain causes an alert to be triggered. An alert may be an SNMP trap and/or an email notification, or some other kind of message dispatch as supported by the system (such as a text message sent via SMS/MMS, a pager notification sent via SNPP, an Instant Message via XMPP and so forth).

Reactive:

By hooking into sending software, the method and system of the present invention can computationally assess and make a multi-part assessment of the final disposition of delivery attempts as they occur—i.e., in real-time, rather than making an evaluation that is dependent on how many times a certain occurrence happens in a specified monitoring period and then taking action at the end of such a specified monitoring period of time (see FIG. 5). The invention maintains a Rule-set of known or accepted best practices for a number of recipient domains. Each time a delivery attempt concludes unsuccessfully, the Rule-set for the recipient domain is assessed one rule at a time, comparing the disposition with the rule criteria. Actions specified by rule include setting a blackhole or suspension status, adjusting shaping parameters, reclassifying disposition from permanent to transient or vice versa.

If the disposition matches, the rule is checked to see if it should trigger, based on the acceptable frequency of the occurrence coded into the rule. For instance, if a batch of 100 messages results in a particular response 100 times in the course of 1 minute it may be desirable to have the action associated with the rule trigger only once instead of 100 times.

If a rule is deemed to have "matched" and so is triggered, one or more of the following actions can be taken:

Suspend the sending-IP-recipient-domain combination for a period of time, preventing it from being attempted for delivery until the suspension is lifted. An alert is triggered for a suspension, as described above.

Cause mail associated with the sending-IP-recipient-domain combination to be discarded without further delivery attempts for a period of time (Blackhole). An alert is triggered when this rule is enacted, as described above.

Increase or decrease overall traffic shaping rules by one step for the sending-IP-recipient-domain combination. These are used described in the just-in-time section below.

Adjust the retry interval for the sending-IP-recipient-domain combination to handle a greylisting response from the recipient site. Greylisting is a technique used by receivers when they are unsure about a sender; it results in mail being delayed until a later time. The invention adjusts the retry interval such that retries are made more or less aggressively depending on the content of the greylisting response. For instance, if the response indicates that greylisting is being applied for the next 30 minutes, the retry interval will be adjusted to match that, as a more aggressive schedule may result in bad reputation, and a less aggressive schedule will result in longer delays than are necessary.

Adjust the age of the sending-IP address. The age is used as a parameter in the just-in-time section below.

Adjust a specific traffic shaping parameter by a specified amount (positive or negative). Possible parameters are listed below.

Re-interpret a transient rejection response as a permanent rejection response.

Re-interpret a permanent rejection response as a transient rejection response.

Just in Time/Proactive:

The invention hooks into the email sending system such that it can override configuration values as they are evaluated. For instance, when determining the number of connections that should be established to a recipient domain for a given sending-IP-address, the invention is invoked and is able to make a traffic shaping adjustment at that time, if it necessary.

The system and method of the present invention use this vector to assess whether it should make a proactive adjustment to the shaping parameters. This adjustment can be made based on the information collected for the binding, and can be either a positive or a negative adjustment. In an exemplary embodiment, Applicants have implemented a very simple algorithm that increases the shaping parameter by one positive increment if we have not made a negative adjustment in the past hour (configurable).

Proactive adjustments are throttled such that the system will not make more than one adjustment for a sending-IP-recipient-domain combination in a given minute interval (configurable). This prevents the system from rapidly increasing its parameters to the point where it would cause a deliverability issue; by slowly stepping in the changes, the system can react to the disposition returned from the receiving domain and correct the action before it becomes a serious problem.

Running just-in-time avoids expensive configuration adjustments that would be required if the logic behind the adjustments was run as a periodic assessment; there are a large number of traffic shaping parameters and with customers using several thousand IP addresses to send to 50,000 domains, the processing required for assessing the status of the system would become computationally prohibitive.

The effective configuration value can be expressed in a parametric form, such that the value can be computed based on a rule-defined function. We use this form to express rules such as "new IP addresses should limit their send rate to X per hour until they have sent Y messages, at which point they can increase to Z messages per hour". These rules are usually derived from accepted best practices for well-known receivers.

User Configuration or Interaction:

The invention was built such that a system administrator can override the actions of the invention to by configuring guide rails (upper and lower bounds) for each configuration option that the invention adjusts, as well as being able to selectively enable or disable the adaptive delivery capabilities on a per sending-IP-recipient-domain combination.

The invention provides interactive commands via a command console to allow the administrator to introspect or clear the state of the traffic shaping parameters. The console also provides the ability to list and override suspensions or blackholes triggered by rulesets.

A daily report email is generated that summarizes the deliverability and parameters for the administrator.

Parameters:

The invention specifically makes adjustments to the following parameters, although the technique can be generally applied to any of the systems parameters that affect load and resource management. The values may be scoped globally or on a per-sending-IP-per-recipient-domain basis, or some combination thereof, such that overrides put in place can be specified once for a given recipient-domain (or even globally) without having to be specified explicitly for each possible sending IP address (as they may number into in the thousands). A description of the parameters as they apply to Applicant's system is supplied to aid the reader in understanding the nature of the parameters; the invention is not specifically limited to operating with parameters that have precisely the same meaning.

Max_Deliveries_Per_Connection—the number of deliveries attempted on a given TCP connection before closing the connection Max_Outbound_Connections—the number of concurrent connections permitted for a given recipient domain Outbound_Throttle_Messages—the maximum rate at which messages may be sent Max_Recipients_Per_Connection—the maximum number of recipients permitted to be sent on a given TCP connection before closing the connection. Similar to Max_Deliveries_Per_Connection, but takes into account the fact that email messages may be addressed to multiple recipients in a batch email.

Max_Recipients_Per_Batch—the maximum number of recipients permitted to be sent as part of a batch email send for a given message. Messages that have more than this number of recipients are broken up into smaller batches.

Idle_Timeout—the time period to keep a connection open to given recipient domain address after the sending queue has been exhausted. The connection may be re-used within this time period to reduce the overhead of re-establishing the connection if more mail arrives for that destination.

EHLO_Timeout—the time period that the sending system will wait for a response from the recipient system when waiting for the SMTP "EHLO" response.

MailFrom_Timeout—the time period that the sending system will wait for a response from the recipient system when waiting for the SMTP "MAIL FROM" response.

RCPTTO_Timeout—the time period that the sending system will wait for a response from the recipient system when waiting for the SMTP "RCPT TO" response.

BODY_Timeout—the time period that the sending system will wait for a response from the recipient system when waiting for the SMTP "DATA" response.

RSET_Timeout—the time period that the sending system will wait for a response from the recipient system when waiting for the SMTP "RSET" response.

Retry_Interval—the base time period which should elapse before re-attempting delivery of a message that was transiently rejected by the recipient. In Applicants system, this time period is applied exponentially with each additional retry until the message expires from the system.

Max_Retries—the maximum number of delivery attempts before determining that a message will never be accepted and thus be expired from the system.

Max_Resident_Active_Queue—the maximum number of messages to be committed to RAM for a given recipient domain queue. If the volume of messages in the queue exceeds this number, the excess messages are put into a lower resource consumption mode that requires a disk access before they can be sent.

Thread Pool size—Applicant's system uses a number of pools of threads to carry out certain tasks. The optimal number of threads for a given system depends on the workload, which in turn can vary over time.

Outbound_Throttle_Connections—the maximum rate at which new connections may be established Inbound_Throttle—the maximum rate at which new messages are allowed into the system Max_Resident_Messages—the maximum number of messages that can be committed to RAM for the system overall, as opposed to the Max_Resident_Active_Queue which is the per recipient domain value.

Max_Retry_Interval—caps the effective retry interval value when calculating the interval based on the number of attempts and the Retry_Interval Metrics/Consumed Information:

The following metrics/information are fed into the invention and can influence its actions in Applicant's current implementation:

Message disposition for permanent and transient failure responses

Permanent failure rate for the binding-domain expressed as a percentage of delivery attempts over the last hour The age of a binding (IP address), expressed as time since the address was first used.

The following metrics/information can be consumed by the invention:

Average delivery time in seconds over the last hour

Average length of time taken to dispatch a job to a particular thread pool over the last hour.

Implementation:

The invention is implemented in two parts; a module written in the "C" language that hooks into the email system internals and a module written in the "Lua" language that implements the majority of the algorithms. The latter part is implemented in "Lua" so that the rule-sets update mechanism can be implemented without the need to deliver compiled object files that are system specific. This implementation choice is not a fundamental requirement of the invention, but a convenience for Applicant's software delivery mechanism in that it reduces overheads for development and deployment of revised rules.

Initialization:

The adaptive module initializes by attaching hooks to monitor message disposition and override the effective value of configuration parameters as listed above in the paragraph entitled "Parameters." It also arranges to run a periodic task known as the "bounce sweep" at an interval specified by the Bounce Sweep Interval parameter; this defaults to hourly. The adaptive module maintains its state in a non-transitory data storage medium, such that a process or system restart does not cause it to lose its settings.

Bounce Sweep:

The purpose of this task is to periodically (based on the Bounce_Sweep_Interval parameter) iterate each binding-domain (distinct source IP address and recipient domain), and if adaptive tuning is enabled for that binding-domain (as controlled by the Adaptive_Enabled parameter), and if the number of delivery attempts exceeds the value specified by the Adaptive_Attempt_Threshold parameter (default 100), examine the sending failure rate expressed as the number of failures divided by the number of attempts.

If the failure rate exceeds the value specified by the Adaptive_Rejection_Rate_Suspension_Percentage parameter (default 10%), and if no other adaptive adjustments have been applied within the period specified by the Adaptive_Adjustment_Interval parameter (default 60 seconds), then the binding-domain is suspended as detailed in the paragraph entitled "Suspend Domain", for a duration specified by the Adaptive_Default_Suspension parameter (default 4 hours).

A future implementation of the invention will apply similar rules and processing around the transient failure rate.

Fine Grained Assessment Based on the Classification of Delivery Failures:

The ultimate cause of a failed delivery attempt can be one of many varied reasons, some more serious than others, from the perspective of maintaining a good sending reputation (for example, a high volume of invalid recipient address responses can lead to the sender being blocked).

In applicant's preferred embodiment, a standard bounce classification facility analyzes the protocol level responses and classifies them into one of a number of possible broad reasons, such as "mailbox is full", "message too large" and so forth. In Applicant's embodiment, the classification system is supplied with some system defined classification codes, and a facility that allows a local administrator to define and expand rules that will classify new and varied responses to match the system defined codes. Furthermore, the same facility allows the local administrator to define new classifications. Each classification is identified by a classification code, which happens to be a numeric code in Applicant's implementation, but could also be some other identifier.

Applicant's preferred embodiment of the Adaptive Delivery facility is to record the incidence of each classification code as protocol level (such as SMTP) responses are received. These classification codes are tracked historically such that the volume of any particular classification code encountered for a given binding-domain over the time period specified by the Bounce_Sweep_Interval parameter are known to the system.

The Bounce Sweep task, in addition to the basic processing described in the paragraph entitled "Bounce Sweep", can be configured to act upon the rates of bounce classifications passing defined thresholds by defining rules that have the following attributes:

A list of the bounce classification codes

A low threshold, expressed as a percentage

A high threshold, expressed as a percentage

An action to be triggered when the low threshold is crossed

An action to be triggered when the high threshold is crossed

The Bounce Sweep task will assess the rules that are defined for a given binding-domain, as controlled by the Adaptive_Enabled parameter, using the following logic:

define a volume counter and initialize its value to 0 define an attempts counter and set it to the number of delivery attempts made by the current binding-domain over the prior Bounce_Sweep_Interval time period compare the value of the attempts counter with the Adaptive_Attempt_Threshold parameter (default 100). If the attempts counter is less than the attempt threshold, stop processing the current rule and continue processing with subsequent rules.

For each bounce classification code listed with the rule, retrieve the volume of failures classified with that code and add that value to the volume counter that was initialized in the first step compute a rate percentage by dividing the volume counter by the attempts counter if the rate percentage is greater than or equal to the value of the high threshold parameter, then apply the action specified by the high threshold action parameter and stop processing the current rule, continue processing with subsequent rules.

if the rate percentage is greater than or equal to the value of the low threshold parameter, then apply the action specified by the low threshold action parameter and stop processing the current rule, continue processing with subsequent rules.

The action referred to in the description of the high/low threshold actions above can be any one of the actions listed in the paragraph entitled "Disposition Processing".

The system is pre-configured with a rule with the following parameters:

Classification codes: "hard bounce", "mailbox full", "message too big"
low threshold 3%
low action ("throttle" "down")
high threshold 10%
high action ("suspend" "4 hours")

This has the effect of slowing down the sending rate once the combined total of failures classified as "hard bounce", "mailbox full" or "message too big" exceeds 3%, and suspending the mail flow when this rate reaches 10%.

There may be multiple rules, and those rules can be expressed on a binding-domain basis by the local administrator.

Abuse Feedback Loop Processing:

The (prior art) open standard for complaint feedback loop processing is a feedback loop (FBL), sometimes called a complaint feedback loop, and provides an inter-organizational form of feedback by which an Internet service provider (ISP) forwards the complaints originating from their users to the sender's organizations. ISPs can receive users' complaints by placing report spam buttons on their webmail pages, or in their email client, or via help desks. The message sender's organization, often an email service provider, has to come to an agreement with each ISP from which they want to collect users' complaints. As an alternative, abuse complaints may be directly sent to addresses where such feedback might be received. Target abuse mailboxes can be assumed to be in the form defined by RFC 2142 (abuse@example.com), or determined by querying either the regional Internet registry's whois databases—which may have query result limits—or other databases created specifically for this purpose.

The receiving sites that implement FBL processing have very stringent requirements on the volume of complaints that are issued against a given sender; it is not uncommon for a sender to be blocked if less than 1% of their messages result in complaints. As such, it is important to react to FBL information as quickly as possible.

In accordance with the present invention, a preferred embodiment has a facility that recognizes FBL report message payloads (as described by RFC 5965) and records their incidence in a similar fashion to that described in the paragraph entitled "Fine Grained Assessment Based on the Classification of Delivery Failures" above, except that it does so over a separate, longer, time period known as the FBL_Sweep_Period. The default for this parameter is 24 hours.

The Bounce Sweep task, in addition to processing the rules in the paragraph entitled "Fine Grained Assessment Based on the Classification of Delivery Failures" above, processes a very similar of rules that are specific to FBL. The rules have similar attributes:

A list of the applicable FBL report types (eg: abuse, fraud, virus, other)
A low threshold, expressed as a percentage
A high threshold, expressed as a percentage
An action to be triggered when the low threshold is crossed
An action to be triggered when the high threshold is crossed The logic for evaluating and acting upon these rules is similar to that described in the paragraph entitled "Fine Grained Assessment Based on the Classification of Delivery Failures", except that instead of using the Bounce_Sweep_Interval as the time period used for assessing the volume, the FBL_Sweep_Period is used. It is important to note that this logic is still evaluated every Bounce_Sweep_Interval, such that the preferred embodiment in its default configuration assesses the FBL rules every hour, but acts upon rate data collected over the preceding 24 hours.

Applicant's preferred embodiment provides a default setting for this rule:

All FBL report types
low threshold 0.2%
low action ("throttle" "down")
high threshold 0.5%
high action ("suspend", "4 hours")

This has the effect of slowing down mail, perhaps stepping down the throttle multiple times, while a significant volume of FBL reports are discovered, with the intention of ultimately suspending delivery prior to the receiver enacting a mail block.

Suspend Domain:

The purpose of this task is to cease delivery attempts for a particular binding-domain (distinct source IP address and recipient domain) for specified time duration.

This task will trigger a notification with the message "suspending for <duration>" as detailed in the paragraph entitled "Notify".

It will then record in the adaptive module state that the binding-domain is subject to suspension for the requested duration. It will not alter or extend the state of a suspension that may already be in place.

Finally, it will clear the adaptive tunings it has put in place as part of Configuration Modification.

Notify:

The purpose of this task is to notify the administrator that an event took place. When invoked, the triggering binding (sending IP), domain (recipient domain), rule, triggering disposition information and descriptive text are passed in as parameters. To avoid repeatedly sending the same notification in a short time span, the notify routine throttles the notification such that for a given set of triggering criteria (based on the parameters passed in above), no more than 1 notification is generated in each interval specified by the Adaptive_Notification_Interval parameter (default 1 hour).

When a notification is generated, the implementation will generate an email message payload (which may be routed out of this system via some other protocol, such as SMPP, as dependent on the system configuration) addressed to the recipients specified by the Adaptive_Alert_Email_Destination parameter (must be configured by the system administrator) and sourced from the address specified by the Adaptive_Alert_Email_Sender (default is the NULL sender address, which cannot be replied to).

The notification message payload includes the text:

This is an alert generated by the Adaptive Delivery Component.

The alert pertains to:
Domain: <DOMAIN>
Binding: <BINDING>
Host: <HOSTNAME-OF-THE-MACHINE-GENERATING-THE-ALERT>

It also includes the triggering information in the message payload, as well as the descriptive text. For example, in the case of a domain suspension, the descriptive text will be "suspended for <DURATION>". The subject of the notification message is formatted as:

ALERT: <BINDING>/<DOMAIN> on <HOSTNAME-OF-THE-MACHINE-GENERATING-THE-ALERT>.

Alternatively, notifications may be to be sent in the form of an SNMP trap.

Configuration Modification:

In Applicant's implementation, the Adaptive Delivery module performs the bulk of the parameter adjustments by hooking into the configuration system, such that it can modify the effective values of the system parameters. We chose to do this rather than change the actual configured value for two reasons. The first is that application of a changed configuration can have some heavyweight processes associated with it to validate overall configuration consistency and potentially invalidate cached information. In short, regular adaptive tunings can potentially negatively impact performance if they are implemented in this way in Applicant's system. The second reason for implementing as a reader-hook is that it allows the value to be computed parametrically at the time it is needed. This allows powerful rules to be expressed.

This section of the text details the steps that are taken to determine the effective value of a parameter at the time it is needed.

For a given configuration parameter, the Adaptive Delivery hook is invoked and passed the configured value specified by the user in the configuration file, the name of the parameter being interrogated and the binding-domain information (the source IP address and recipient domain). It is important to note that the system supports both binding-domain specific configuration and binding specific configuration. When an option is being queried at the binding level, no domain will be passed to the interrogation function.

If the parameter is Suspend_Delivery or Blackhole, and the configuration system indicates that the parameter is disabled (indicating that traffic should flow as usual), the Adaptive Delivery data store is consulted to determine if a Suspension or Blackhole (respectively) is in effect. The result of this consultation is used as the effective value for these parameters, and further processing for them stop here. The rest of this section details what happens to the other parameters.

If the parameter is not Suspend_Delivery and not Blackhole, then the adaptive "guide rail" values are determined by obtaining the value of the parameter named "Adaptive_<PARAMETERNAME>". For example, if the parameter currently being interrogated is "Max_Outbound_Connections", then the value of the "Adaptive_Max_Outbound_Connections" parameter is examined to determine acceptable lower and upper bounds for the range of tuning. There is no default value for these guide rail values; if they are not explicitly configured then there is deemed to be no user override for the parameter tuning.

If there is no user-specified guide value, the Rule-sets are consulted according to the following logic:

1. If the Rule-set defines an alias for the specified domain, re-interpret the domain as though it was specified as the alias and repeat, until we have arrived at a canonical Rule-set, or a domain with no specified rules. This allows for a single set of rules to be defined for a site that has many distinct top-level-domains (TLDs). An example of this is Yahoo!; they have many different top-level domains to establish their presence in many different territories. If no domain was provided to this interrogation function, treat the domain as though it specified the global wildcard Rule-set named "*".

2. If a Rule-set is defined for the domain specified by the result of step 1, proceed to step 4.

3. This step transforms a name of the form subdomain.example.com to a pattern string of the form "*.example.com" (a wildcard Rule-set). If a rule-set is defined for this modified name, proceed to step 4. It is important to note that this step does not perform an actual wildcard match, it is checking to determine if there is a wildcard Rule-set defined. If no wildcard Rule-set is defined, this step repetitively strips off the node name from the left hand side until it either finds a defined wildcard Rule-set or arrives at the global wildcard rule-set named "*". If the domain to be interrogated is "subdomain.example.com" then the following set of Rule-set names, in this specified order, will be searched and the search will stop at the first defined rule-set: "subdomain.example.com", "*.example.com", "*.com", "*".

4. Given a Rule-set from step 2 or 3 above, the rule-set is examined to determine if it defines a configuration guide for the configuration value being interrogated. If it does not, and we arrived here as part of a search from Step 3, the search is continued until we arrive at a rule-set that does define a guide or until there are no more Rule-sets to examine.

At this point, we have either a guide value specified by the system administrator from the configuration file, or the most specific guide value for the binding-domain of interest as specified in the Rule-sets, or no guide value.

If no guide value is found, then it is deemed that no adaptive tuning is allowed and the configured value for the parameter it returned to the system. Otherwise, the following steps are taken:

1. The age of the binding (sending IP) is determined. If the adaptive delivery module has never observed the binding before, the current time is recorded as the "birth date" for the binding and will be used as the basis of subsequent binding age determination and processing moves to Step 5.

2. Otherwise (the binding is already known to the adaptive module), the recorded value for the parameter being interrogated, the last_change time for that parameter, and the number of messages sent to the domain from the binding are looked up from the adaptive delivery data store.

3. Determines if the value for the parameter being interrogated should be adjusted. If the binding-domain is suspended, the value will not be adjusted. If it is not suspended, and the last_change time is more than the value of the Adaptive_Positive_Adjustment_Interval parameter (default 1 hour) and if no other adjustments have been applied for this binding-domain within the time interval specified by the Adaptive_Adjustment_Interval parameter (60 seconds), then the value is subject to adjustment.

4. If the value is subject to adjustment, the current implementation simply increases the value by adding 1 to it (future implementations may use larger values, perhaps scaled according to the range of the guide values, or even negative values, based on related metrics, such as observed message throughput changes over time, average time for delivery changes over time and outgoing bandwidth utilization from the source IP to the recipient domain changes over time).

5. At this point, we have arrived at a value for the parameter that started at the number configured in the configuration file, and that may have been subject to adjustments per the rules above. The next step is to apply the guide value that was determined based on the recipient domain.

a. If the guide value is a pair of values, it is interpreted as lower and upper bounds for the value. If the binding is new (we arrived here from step 1), we treat the effective value as that specified by the lower bound in the guide. Otherwise, the possibly-adjusted value is clipped such it is not less than the lower bound and not greater than the upper-bound specified by the guide.
b. If the guide value is a numeric value, it is used as a single fixed value that cannot vary; it overrides the user-specified configuration (if any) for the parameter being interrogated.
c. If the guide value is a function type, it is a parametric guide and is invoked, passing the possibly-adjusted value, the age of the binding (expressed as time since the birth-date recorded in Step 1), and the number of messages sent to the recipient domain from that binding. The return value of the parametric guide function is used as the new adjusted parameter value.

6. If the value for the parameter was adjusted as part of the above processing, it is stored in the adaptive delivery data store, so that it is recorded and available in the event of a process or system restart.

7. The possibly-adjusted value for the parameter is returned to the interrogator.

Applicant's implementation employs a cache such that all of the processing described in this section is triggered at most once in every 60 seconds (this can be adjusted via the Adaptive_Cache_TTL parameter).

Disposition Processing:

In reference to FIG. 5, the following text describes in detail the actions taken by the adaptive system during message disposition processing. These actions are triggered at the point where the system has attempted delivery of a message and the destination system has returned an error code and a supplemental description. In the context of SMTP, this will be of the form "250 OK" for a successful delivery, "452 user over quota" for a transient failure (in this case indicating that the recipient mailbox is full) or "550 no such user" for a permanent failure (in this case indicating that the recipient is not known at that address).

For reference, the SMTP protocol is described in RFC 5321 (see, e.g., http://www.rfc-editor.org/rfc/rfc5321.txt) and defines the numeric codes mentioned above. The SMTP reply codes are augmented by a widely adopted standard for enhanced status codes described in RFC 1893 (see, e.g., http://www.rfc-editor.org/rfc/rfc1893.txt) that includes a machine readable auxiliary code in the supplemental description. For example, the "user over quota" response called out above could be returned instead as "452 user over quota" to positively indicate to the sender that the mailbox was indeed full, as distinct from a generic system storage exceeded status implied by the 452 reply code.

This description focuses on SMTP as a means of illustrating the invention, but the method of the present invention is not limited to SMTP; other message delivery protocols have analogous concepts and map to this scheme. It should also be noted that Applicant's implementation currently maps these other protocol responses to equivalent SMTP responses.

The following steps are taken when assessing the disposition of messages; the context of this evaluation includes the message itself as well as the routing information for that message. That routing information includes the destination or recipient domain for the message, as well as the binding (Source IP) to which the message is attached. This section refers to these items as domain and binding, respectively.

In Applicant's implementation, there are certain internally triggered events that will cause these rules to be triggered, but where adaptive processing is not required. The first example of this is at process start-up; if there are messages in the spool that are past their expiration time, the system will treat them as permanent failures and trigger the adaptive processing. Applicant's implementation specifically shortcuts the adaptive processing in this case and instead takes the usual permanent failure processing path through the system.

If the parameter Adaptive_Enabled is set to false for the binding-domain pair from the routing information, the adaptive processing is skipped and regular disposition processing continues.

Next, a Rule-set for the domain is determined by applying similar logic to that described in the paragraph entitled "Configuration Modification":

1. If the Rule-set defines an alias for the domain, the domain is re-interpreted as the target of that alias, recursively until we are left with a domain that does not have an alias defined for it.

2. If the Rule-set defines disposition rules for the domain, we have found the rule-set for that domain and processing of those rules continues as described below this set of numbered bullet points.

3. If no disposition rules are defined for the domain, the domain is re-interpreted according to the following sequence, such that if a wildcard or higher-level hierarchy domain has rules defined, those rules will be used. If the domain is sub-domain.example.com, it is interpreted as the following sequence of domains, one after the other, until a matching Rule-set is located: "*.example.com", "*.com", "*", or when the domain name is "*" and no Rule-set is located If there is no disposition Rule-set defined for the domain, then no further adaptive processing is performed, and regular disposition processing continues. Otherwise, the disposition rule-set is processed by iterating over the defined rules, in the order they were defined.

Transcode Action:

Cause the regular disposition processing to treat the message as though the delivery attempt resulted in a different outcome. For instance, some sites will return a response such as "451 mail permanently deferred", which is a transient response. This results in the messages being retried by the sender until they expire. This action accepts the new status code as its argument.

A transcode rule allows the response to be re-interpreted as a permanent failure instead, resulting in a reduction in load on the sending system and a reduction in bandwidth usage to the recipient site. An example transcode rule definition is shown in Table 1.

This rule causes the "421" to be replaced with "554", and a blackhole to be established. A notification will be triggered with the descriptive text "Remediation with Yahoo required". This action is triggered immediately on detection of the " . . . permanently deferred" response message when it occurs at connection time.

Purge Action:

The purge action causes the messages in the queue for the binding-domain (source IP and recipient domain for the message being examined) to be purged.

This action accepts a failure reason as its argument. Each message in the applicable queue is treated as though it failed due to the failure reason argument passed to this action.

Suspend Action:

This action triggers the suspension activity as described in the paragraph entitled "Suspend Domain."

The action accepts a time duration as its argument; this is used to specify how long the binding-domain should be suspended. An example suspension rule is shown in Table 1.

This example will trigger a suspension if the "temporarily deferred" pattern specified by code is matched 5 times in the space of 1 second; when it does, message flow is suspended for a period of 4 hours.

Blackhole Action:

The blackhole action enables blackhole mode for the specified binding-domain. Reference FIG. 4; when a blackhole is enabled, the regular delivery workflow is altered such that instead of delivering mail, the mail is instead treated as failed without making a delivery attempt.

Similar to the suspension processing (See the paragraph entitled "Suspend Domain"), this action will trigger a notification with the message "blackholing for <duration>" as detailed in the paragraph entitled "Notify". It will then record in the adaptive module state that the binding-domain is subject to blackhole for the requested duration. It will not alter or extend the state of a blackhole that may already be in place.

In the method of the present invention, when it would be beneficial to do so, the system may set the status for the adaptive module used with a queue to "blackhole". The steps taken for this are:

1. Record the blackhole status and expiration time in the adaptive delivery data store
2. Send a notification to the administrator that a blackhole has been enacted
3. For each message currently in the queue that has been set to blackhole:
   Record a failure due to blackhole to the appropriate logs
   Remove the message from the spool, and
4. During reception of new messages into the system, the system will inspect the blackhole status for the queue that will be used. If the queue status is set to blackhole, and the blackhole period has not expired, instead of accepting delivery of the message, the system will return an error message indicating that a blackhole is in effect. This allows the system's users to avoid paying 10 costs for journaling the message to spool. The system also logs the rejection message to the appropriate logs. These steps mean that the system will not attempt delivery to the destination until the blackhole status has expired.

Figure 12:
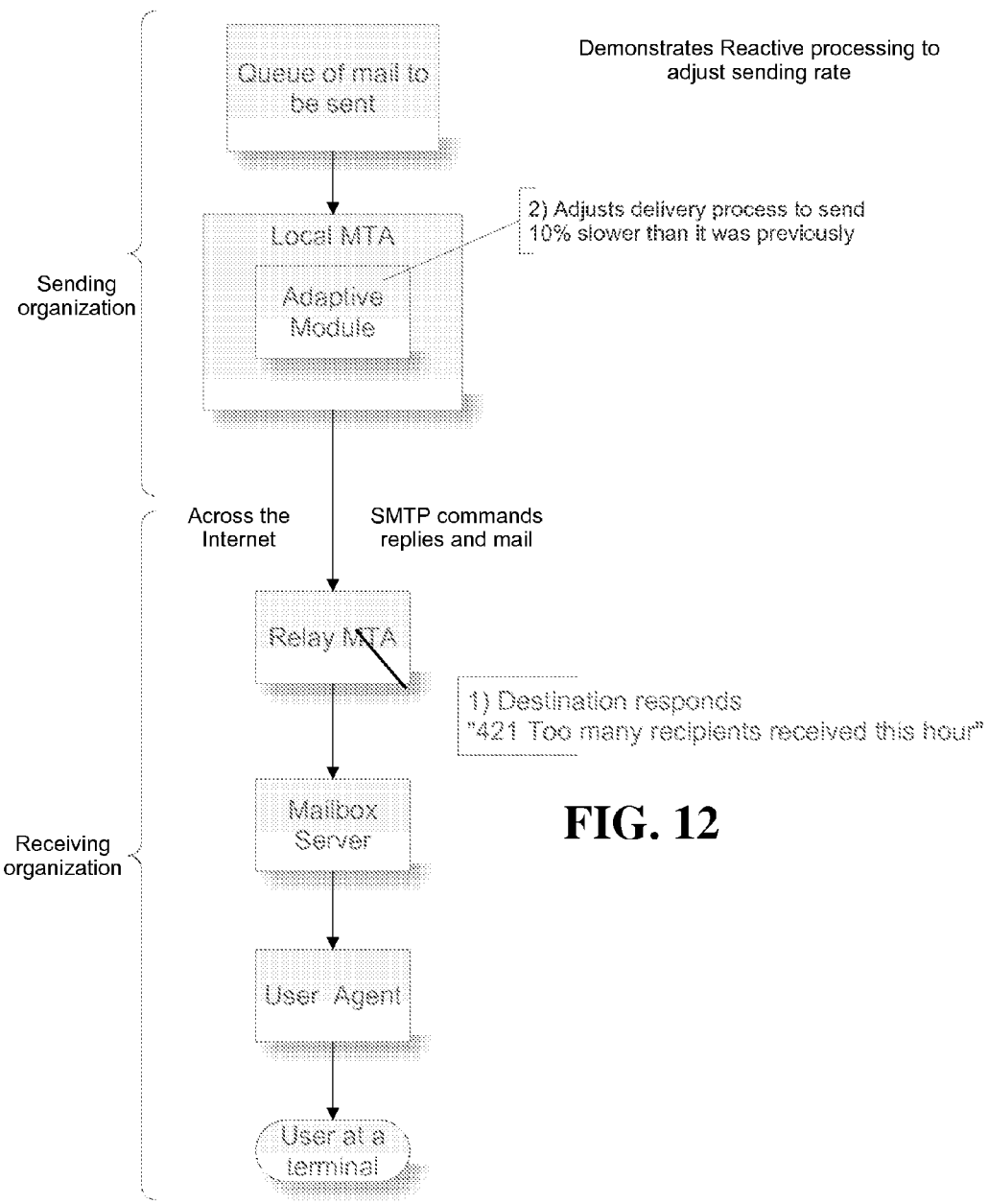
FIG. 12 is a flow chart illustrating reactive processing to adjust sending rate in accordance with the present invention, and demonstrates the steps taken when receiver has too many recipients including the sender during a receiver specified period of time.

Throttle Action:

As illustrated in FIG. 12, the throttle action makes an adjustment to the traffic shaping parameters such that the sending rate is adjusted in a direction specified the parameter passed to the action.

Applicant's implementation currently only supports throttling "down", but it is envisioned that there may be some circumstances where throttling "up" is desired. The throttle action takes the following steps:

Triggers a notification that the throttling parameters are being adjusted, per the paragraph entitled "Notify", with the informational text "adjusting throttle <DIRECTION>". When throttling "down", the current (possibly-adjusted via the paragraph entitled "Configuration Modification") value of the Outbound_Throttle_Messages parameter (default is not specified; a given rule-set may establish a best practice default, and this may be adjusted via the paragraph entitled "Configuration Modification") will be reduced by 10%. If Outbound_Throttle_Messages is explicitly configured to be unlimited, the throttle action has no effect.

Warmup:

The warmup action causes the age (in seconds) of the binding (source IP) to be set to the value specified by the action parameter. The concept of IP Warmup is that many well-known receiving sites have established policies around the volume of messages that they want to see from a given sender, and that these policies are often time based, resulting in a relatively low allowed throughput in the first two weeks (for example) of the IP being established, and ramping up over time after that point.

The adaptive module implements these policies via parametric configuration guides, as described in the prior paragraph entitled "Parameters." One of the parameters used in these guides is the age of the binding.

An example warmup rule is shown in Table 1. This rule cases the age of the binding to be reset to 1 second when a connection attempt results in the text above being returned.

Greylisted Action:

The greylisted action is intended to be applied in situations where greylisting is detected. The intention is to tune the retry time such that the next delivery attempt will be made at the "right" time without unnecessary delivery attempts before we know that the receiver site is willing to accept the message.

In the current implementation, the greylist action expects a time duration as its parameter. This specifies the revised retry interval. A future implementation might instead extract the duration from the disposition itself.

When the greylist action is invoked, the current (possibly adjusted, per the paragraph entitled "Configuration Modification") value for the Retry_Interval parameter is determined. If the parameter value is less than the time duration parameter passed to this greylist action, the Retry_Interval parameter will be adjusted upwards to match the greylisting duration.

Additionally, the (possibly adjusted, per the paragraph entitled "Configuration Modification") value for the Max_Retry_Interval parameter is determined. If the parameter value is less than a reasonable number derived from the greylist duration (in the current implementation, we use 4 times the greylist duration), then the Max_Retry_Interval parameter is adjusted upwards to match the reasonable number (4 times the greylist duration).

An example greylisting rule is shown in Table I.

This is a rather generic match that triggers the greylisted action whenever the disposition text contains the string "grey list", "Greylist", "Grey list" or "grey list".

Reduce Connections Action:

The reduce connections action expects as its parameter a delta that will be applied to the Max_Outbound_Connections parameter.

When invoked, the (possibly adjusted, per the paragraph entitled "Configuration Modification") value for the Max_Outbound_Connections parameter is determined, and the delta value is subtracted from it. If the resultant value is less than one, then it is clamped to have a lower limit of 1. This adjusted value is then used in the future when the system interrogates the value of the Max_Outbound_Connections parameter, as described in the paragraph entitled "Configuration Modification", above.

Reduce Deliveries Action:

The reduce deliveries action expects as its parameter a delta that will be applied to the Max_Deliveries_Per_Connection parameter.

When invoked, the (possibly adjusted, per the paragraph entitled "Configuration Modification") value for the Max_Deliveries_Per_Connection parameter is determined, and the delta value is subtracted from it. If the resultant value is less than one, then it is clamped to have a lower limit of 1. This adjusted value is then used in the future when the system interrogates the value of the Max_Deliveries_Per_Connection parameter, as described in the paragraph above entitled "Configuration Modification."

Figure 6:
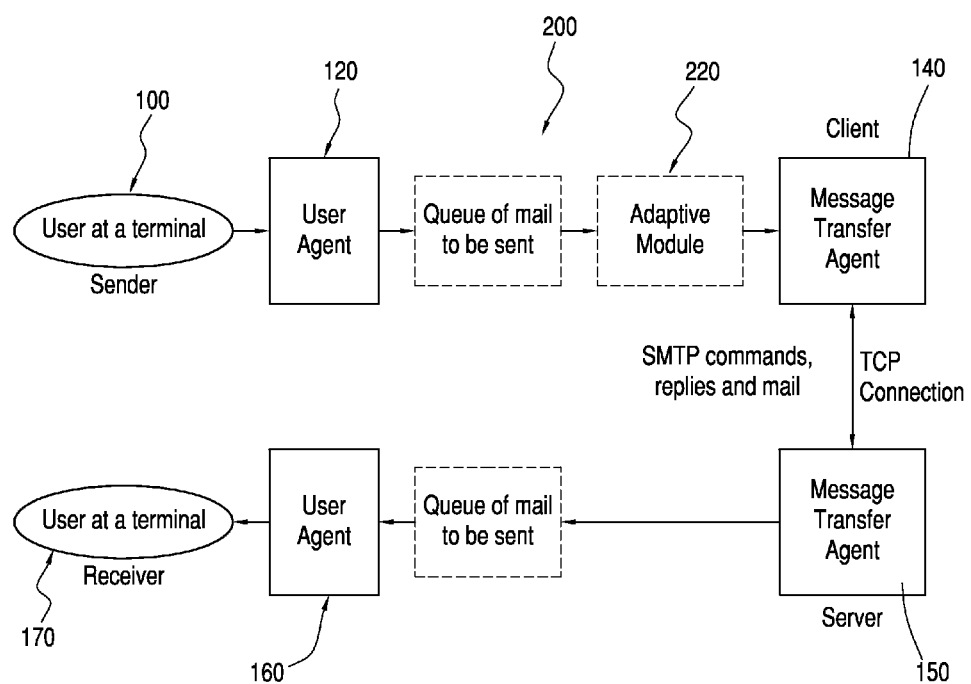
FIG. 6 is a block diagram illustrating the components included in a simple SMTP communications system, in accordance with the present invention.

System Diagrams:

FIG. 6 is a system block diagram illustrating an implementation of the system of the present invention 200. The sender user sends a digital message from a sender terminal 100 intended for a receiving user. The message is sent through a user agent 120 which places the message into a queue of mail to be sent. The adaptive module of the present invention 220 is accessed to analyze the message based upon the configurations set by the system administrator for the binding-domain pair from the routing information. The message is then transferred to the client MTA 140 which transfers the message to the server MTA 150. The server MTA 150 places the message into a queue for delivery to the receiver's user agent 160. User agent 160 receives the message and makes it available for the receiver user at a receiver terminal 170.

Referring now to FIG. 6, user 100 and user agent 120 may be an individual person sitting at his or her computer using Microsoft Outlook, but "user" and "user agent" should not be limited to that example. A message injector is an automated system for automatically generating one or many commercial or non-commercial e-mails or digital messages. Messages automatically generated by a message injector could be automatically generated as a batch of merged message content with a plurality of selected addresses or in response to a selected event such as a message recipient's purchase. Thus, 100 may be a user configuring the batch parameters of the message injector, where examples of batch parameters include message content, overall list of recipients, and 120 can be an automated user agent which transmits a configured set of messages in response to the user's parameters.

Figure 7:
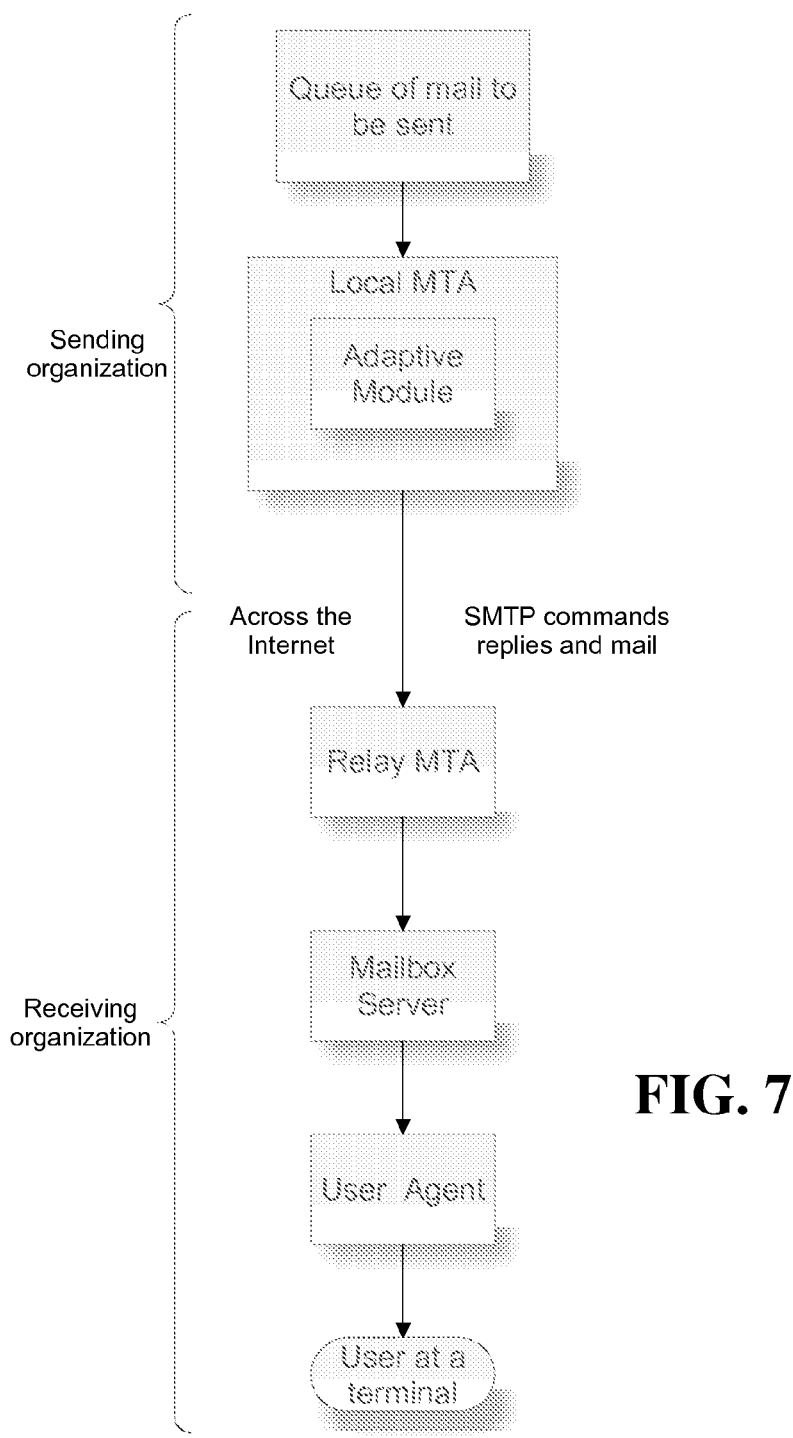
FIG. 7 is a block diagram illustrating the components included in a Relay MTA connected SMTP communications system, in accordance with the present invention.

FIG. 7 is a system diagram illustrating an implementation of the present invention that involves relaying. Similar to the system 200 of FIG. 6, the sender user sends a digital message which is sent through a user agent. The user agent places the message into a queue of mail to be sent and it is analyzed by the adaptive module of the present invention. The message is then transferred to the local MTA, which instead of passing it directly to the receiving host's local MTA, it is passed to a Relay MTA. The Relay MTA places the message into a queue of mail before relaying the message across the internet between at least one other Relay MTA. The Relay MTA transfers the message to the receiving host's local MTA. The local MTA places the message into a queue for deliver to the receiver's user agent. The user agent receives the message and makes it available for the receiver user at a terminal.

The prior art message systems (e.g., as illustrated in FIGS. 1A, 1B and 1C) deal with the transfer of messages from one system to another by meeting the minimum requirements of the various specifications. That is, those systems are designed to receive the transmission of the messages, correctly storing them to the local disk (also known as spooling), and then working through the backlog of messages stored to the spool and delivering them on to the next hop.

This approach tends to be controlled, in most Message Transfer Agent (MTA) software, by a handful of parameters that affect the number of concurrent connections and overall message sending rate. These parameters are typically configured explicitly by a local administrator in response to the demands of their mail flow and, in the case of larger scale senders, based on the feedback from the recipients of that email. In the modern age of communication, the majority of email recipients share the same service providers (e.g., AOL-.sup$^{SM}$, Hotmail.sup$^{SM}$, Gmail.sup$^{SM}$, Yahoo.sup$^{SM}$ and so on), which means that the operators of those services are looking to find ways to manage the inflow of mail to reduce load on their systems and to reduce the incidence of Spam complaints.

As noted above, one of these techniques is known as "Greylisting". One of the capabilities of the SMTP is the concept of a Transient Failure (a numeric code in the range 400-499) which indicates to the sender that they should requeue the message and try again later. Transient Failures are intended to reflect issues such as the system load on the receiving system being above some locally defined limit, or that the local system has exceeded a configured disk quota limit.

Greylisting takes advantage of the transient failure to reflect local policy choices rather than local resource issues. The prime example is that the receiver decides that they don't know enough about the reputation of the sender to make a decision about whether they want to receive the message; they are not on a blacklist (a list of known undesirable senders) and nor are they on a whitelist (a list of known good senders) but they are suspicious of the reputation. In this grey scenario, the receiver can opt to issue a transient failure, causing the sender to requeue the message and try again later, rather than the receiver taking a chance of relaying unwanted content through to the recipient.

Greylisting works well for receivers because it uses less of the high contention resources (the disk and CPU) and reduces the risk of relaying bad content. Some spam senders use special software, known in the industry as Ratware, that is either poorly engineered or deliberately engineered not to follow the precise details of the SMTP specification. One feature of ratware for the serious spam software is that it will not requeue messages if it encounters a transient failure response; it will simply move on to the next address in its list of addresses. Greylisting can effectively block a larger amount of this type of ratware generated spam.

Even if the messages that are greylisted are retried later on, there is still benefit to greylisting from the receiving side; in the time since the message was originally seen by the receiver, there may now be an updated antivirus or antispam Rule-set that can classify the message as being unwanted content.

The above are the benefits of Greylisting for the receiver; they hint at the challenges they impose on legitimate senders, and we'll go into those now.

Greylisted messages are retained in the spool and queueing mechanisms of the sender until the messages are retried later on. A subsequent retry does not guarantee that the message will successfully leave the system; it may still be subject to greylisting on the receiving side. This causes problems for senders; because the sender has no information on how long it will be before the receiver will accept the message, there may be several attempts to deliver. Each delivery attempt results in IO and CPU costs to bring the message in from the spool and network costs to transmit the message. This is wasteful because, in this case, it is unnecessary.

At the opposite end of this is that the sender may opt to wait longer than is necessary to wait before attempting delivery, just based on the way that the majority of MTA software handles a retry schedule (it is common practice to exponentially back-off using a base period of about 15-20 minutes, meaning that after the first attempt the sender will wait 15-20 minutes before the next attempt; if that one is also transiently failed, then it will double the interval before the third attempt, and double it again for the fourth attempt and so on).

Applicant's Adaptive Delivery invention solves these greylisting problems by recognizing a greylisting type of response and intelligently revising the delivery schedule for messages on the same queue as that message.

Figure 8:
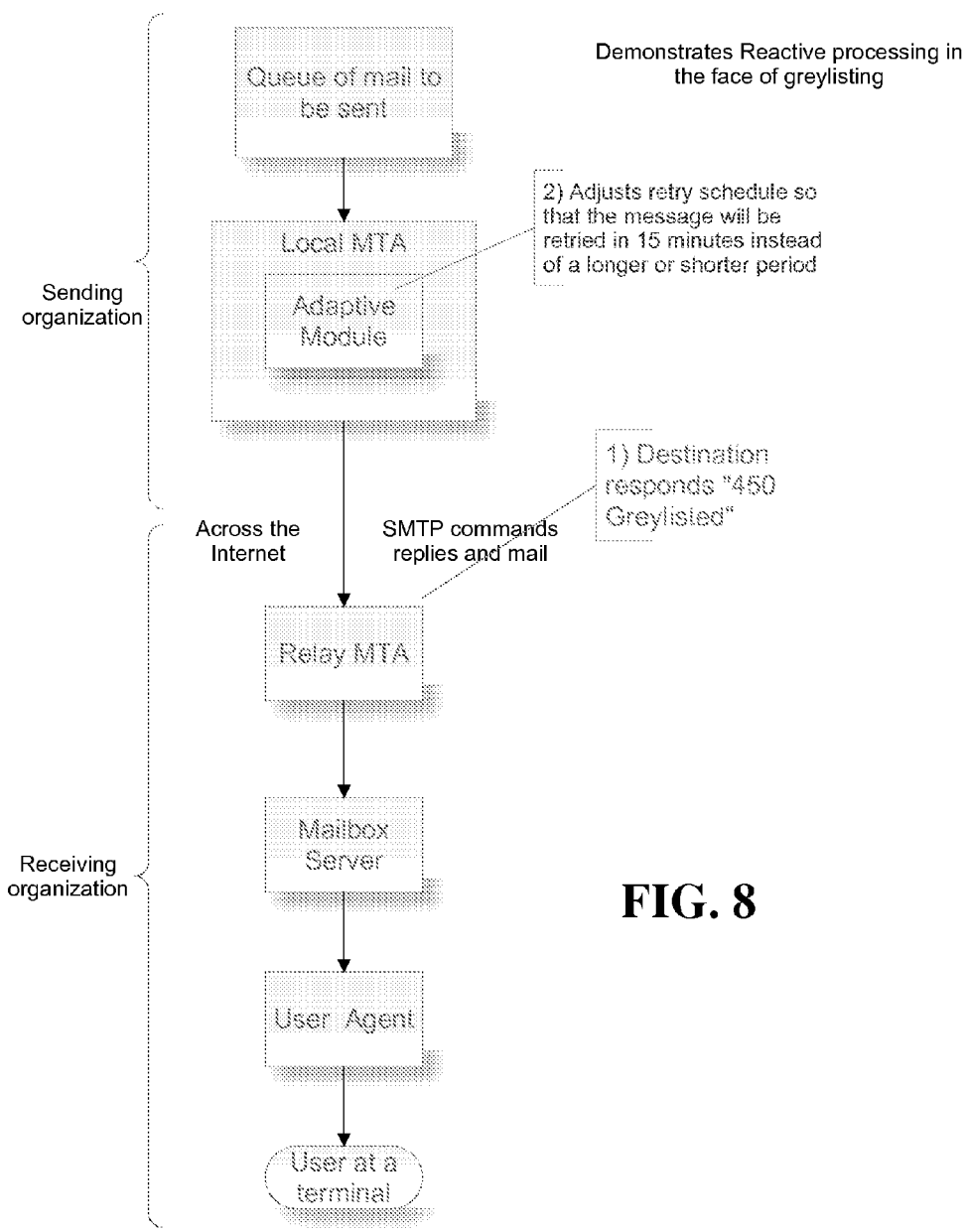
FIG. 8 is a flow chart illustrating reactive processing in the face of greylisting in accordance with the present invention, and shows the steps taken by a sending system when faced with a greylisting problem.

For instance, as illustrated in FIG. 8 (illustrating reactive processing in the face of greylisting), if a given message were being sent from a system using the method of the present invention to some other MTA, and that MTA responded with: 450 Greylisted, Applicant's solution would recognize this response via the following rule definition (and allow the local administrator to configure similar rules):

```
{ code = "(?i)grey ?list";
  trigger = "1",
  action = {"greylisted", "15 minutes"},
  phase = "each_rcpt", },
```

In this rule, the "code" line defines a Perl Compatible Regular Expression (PCRE) that matches the following substrings in the protocol response, case insensitively: "greylist" or "grey list". If a match is found, the "trigger" line defines a triggering threshold, in this case it specifies that the action will trigger immediately. The "action" line specifies which system defined action (or actions) should be carried out when this rule is triggered. In this case, it triggers the "greylisted" rule with a parameter of "15 minutes". The "phase" line scopes the rule to a particular phase of the SMTP protocol dialog; in this case, it is referring to the RCPT TO portion, which expresses each of a list of recipients.

The "greylisted" action used by the rule in this case has the effect of revising the delivery schedule for the queue of mail associated with the message, adjusting two important aspects of the retry schedule. As mentioned above, most MTAs use an exponential backoff to manage the retry schedule; Applicant's solution does this too, with the base period being controlled by a parameter Applicant calls "retry_interval". Applicant also has another parameter that Applicant calls "max_retry_interval" which sets an upper bound on the retry interval For instance, if retry_interval=15 mins, then the retry schedule would be 15, 30, 60, 120, 240 and so on. By setting max_retry_interval=60, the retry schedule would be 15, 30, 60, 60, 60.

The greylisted action has the effect of intelligently adjusting both of these parameters based on the time period parameter passed in via the rule: action={"greylisted", "15 minutes"}.

Applicant's invention will look at the retry_interval parameter; if it is less than 15 minutes, Applicant's invention will raise it to 15 minutes. This type of adjustment is justified because retrying too soon will simply waste CPU and IO resources. Applicant's invention will look at the max_retry_interval parameter; if it is less than four times the action parameter (in this case, 4 time 15=60 minutes), Applicant's invention will raise it to 60 minutes. The rational is similar to the above; having it too small is wasteful, but setting it too large may cause the system to wait too long before sending the message and may cause the sender to be greylisted again, causing an even longer delay.

Figure 9:
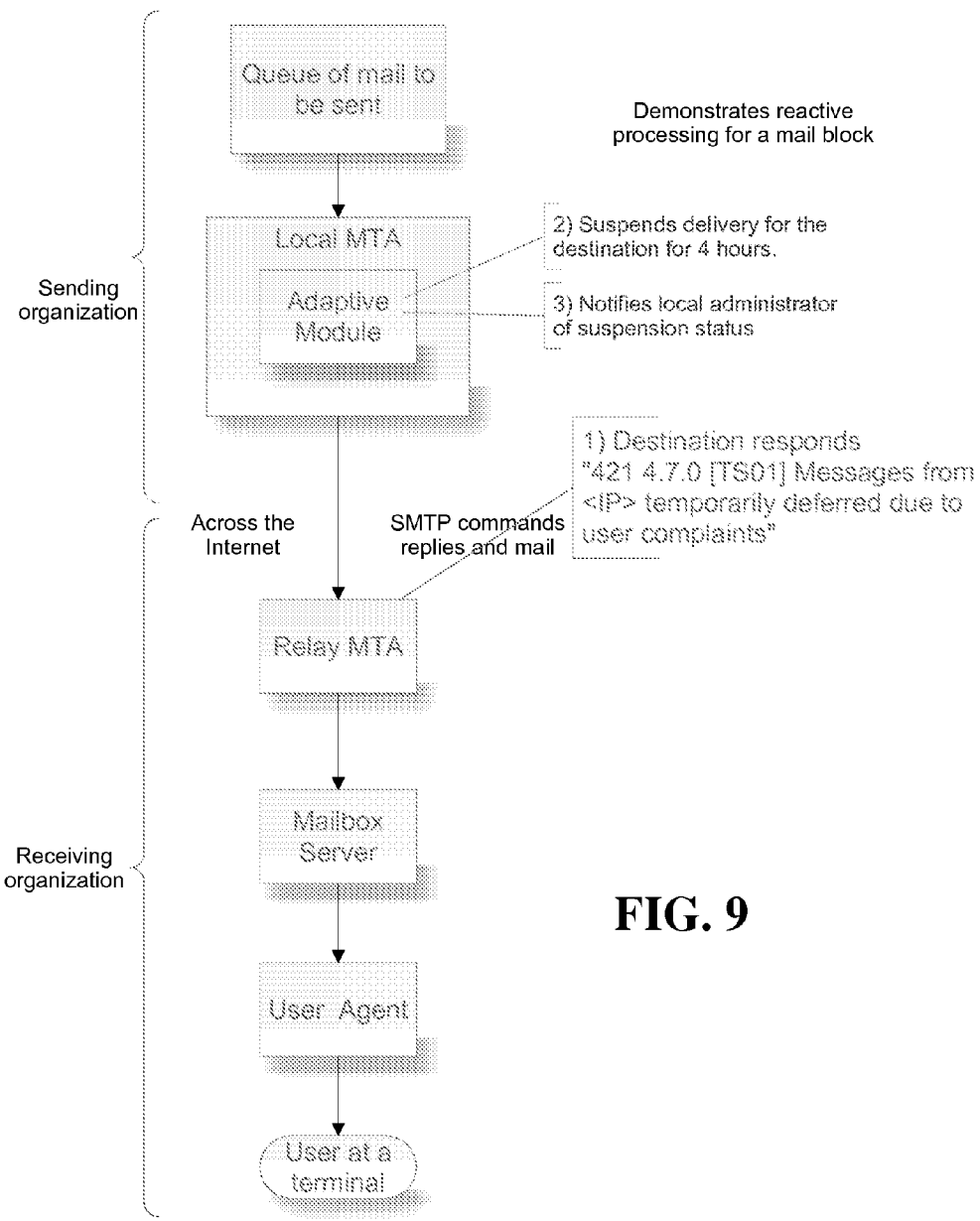
FIG. 9 is a flow chart illustrating reactive processing for a mail block in accordance with the present invention, and shows the steps taken when temporarily deferred because of complaints by the receiving user.

Another facet of Applicant's invention is to dynamically react to responses that indicate that the sender reputation is in jeopardy. Picture the following scenario; an email campaign is sent that has a poor choice of graphics or wording and causes a number of the recipients at the same recipient domain to flag the message as spam. The operator of the domain may automatically enact a temporary block targeted at the sender to prevent more of their users from reporting spam, as illustrated in FIG. 9. This type of block may result in subsequent delivery attempts receiving the following transient failure response:

421 4.7.0 [TS01] Messages from 10.0.0.1 temporarily deferred due to user complaints—4.16.55.1

Most MTAs will treat this just like any other transient failure and requeue the message per the usual retry schedule. In this case, the recipient domain publish their policy in this regard to be that the sender should not send any more messages for the next 4 hours. (in the preferred embodiment, at present). If the sender is using the typical retry schedule mentioned above, then they will be wasting resources by making those attempts, and may even be aggravating the situation with their reputation, as some receivers may decide that the repeated attempts are still too much and may escalate the block to be more permanent or wider reaching (perhaps blacklisting on a shared blacklist).

Applicant's invention avoids these cases with the use of rules (that can be modified or overridden by the local administrator) that can recognize this type of behavior. An example of one of these rules is found in Table 1.

The "code" line is a PCRE that matches the type of response in the example above. In this case, the "phase" is "connect", meaning that the rule is only assessed when connecting and not in subsequent phases of the SMTP protocol dialog (this reduces the amount of effort required to fully process the entire set of rules in use by the system). The critical part of this rule definition is that the "action" is set to "suspend" with a parameter of "4 hours".

In Applicant's solution, the "suspend" action causes the queue associated with the message to have its delivery schedule suspended for the period specified; in this case, 4 hours. This means that the system will not waste any resources making attempts to deliver messages that will not make it out to the destination, and avoid potentially damaging the sending reputation any further.

When a suspension is enacted, Applicant's system will send an alert to the local administrator (or a list of users) to notify them of that fact, and perhaps give a suggestion of what steps should be taken (in this case none, but a later rule will illustrate this).

The suspensions that are currently in effect can be assessed by the local administrator and overridden if need-be (for instance, if the administrator remediated directly with the recipient and cleared the block). Another similar response might be the following: 421 4.7.1 [TS03]—All messages from 10.0.0.1 will be permanently deferred.

Figure 10:
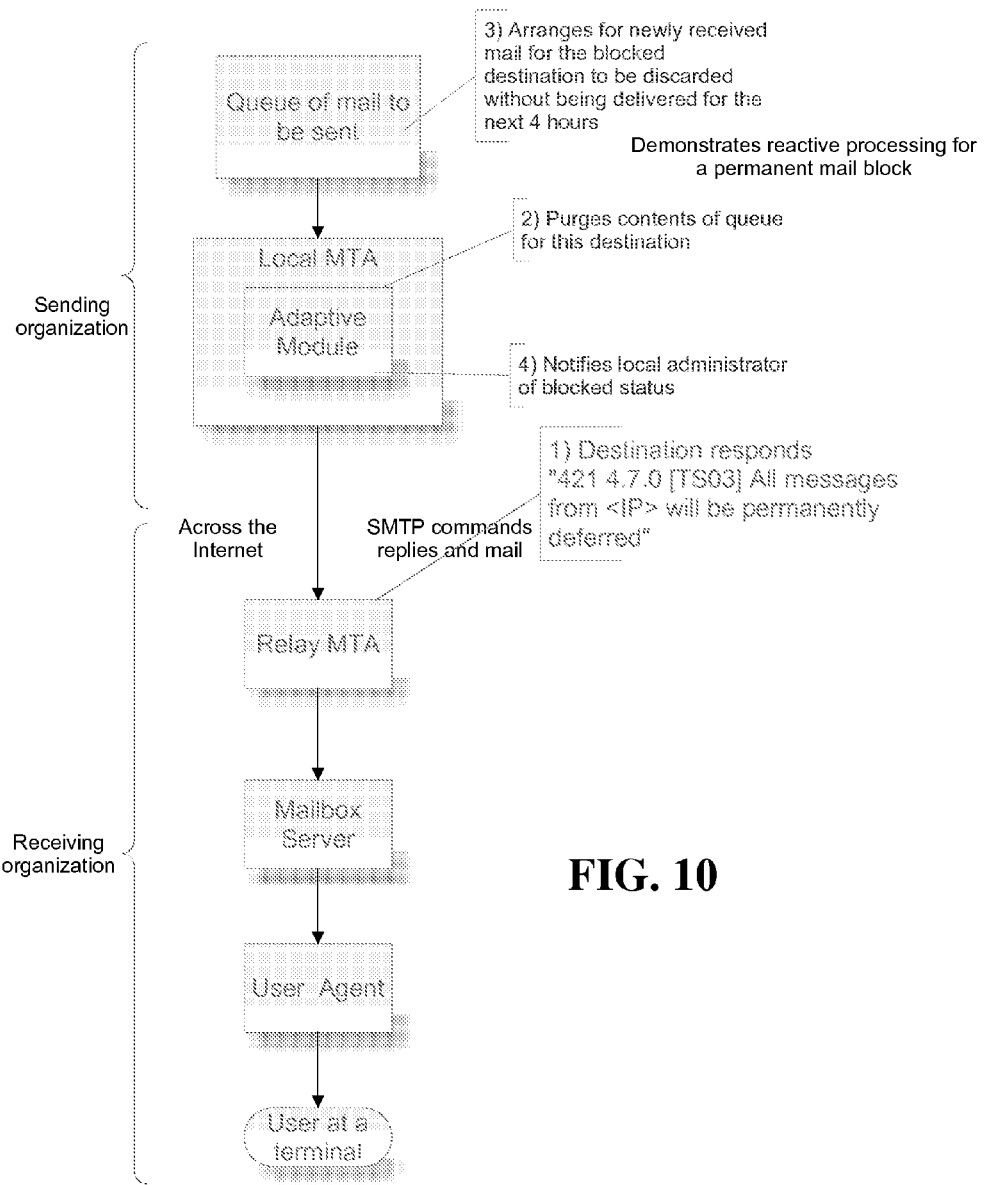
FIG. 10 is a flow chart illustrating reactive processing for a permanent mail block in accordance with the present invention, and demonstrates the operation of a blackhole.

In this case, as illustrated in FIG. 10, the recipient has decided that they never want to receive any mail from the sender, most likely due to a persistent or recurring level of complaints about the sender, and no amount of retries will allow the mail to be accepted by the system unless some remediation takes place with the operator of the recipient domain.

This has similar ramifications to the scenario above; the sending system will continue to waste resources making attempts that will never succeed. Applicant's solution avoids the resource wastage by using the rule shown in Table 1.

This is very similar to the preceding example, except that the "code" matches the SMTP response in this scenario, and that is demonstrates the "message" line, which is used to provide a suggestion to the local administrator that s/he has some action to take.

Another possibility allowed by Applicant's solution is to take that response to heart and to purge all mail queued to that recipient from that mail queue, and arrange for any subsequently received messages destined for that queue to be purged without making a delivery attempt. Applicant call this a "blackhole" because the mail is lost in the blackhole. Applicant might phrase the blackhole rule shown in Table 1.

The operation of the blackhole would be to modify the reception processing mail flow so that any newly received mail destined for the same queue will be marked as permanently failed due to a blackhole (and thus never make an attempt to deliver it), and also will apply the same logic to all of the messages currently in that queue. The blackhole will be temporary and last for a period of 4 hours.

This is much more efficient than trying to send the mail again later; presumably, one of the reasons that the sender was blocked was based on properties of their messages that a large volume of recipients disliked, and there is a high likelihood that the mail that becomes backed up by such a mail block will be more copies of the same content; sending it once the block is lifted is likely to cause the sender to be blocked again. So, purging the queue not only saves resources until the situation is resolved with the recipient, but also minimizes the risk of sending the offending content to more users once it has been resolved.

Another problem scenario is that to do with the rate at which messages are being sent, rather than there being problems with the content of those messages. There are a couple of different ways that receivers track the reception rate of messages, and these are influenced by the way that the SMTP protocol operates.

The first obvious metric is the total number of messages received from a particular source IP address. The next metric is the number of messages received on a given SMTP session (here, session refers to a discrete connection to established from the sender to the receiver). And the next metric is the number of recipients that comprise a batch in SMTP.

Figure 11:
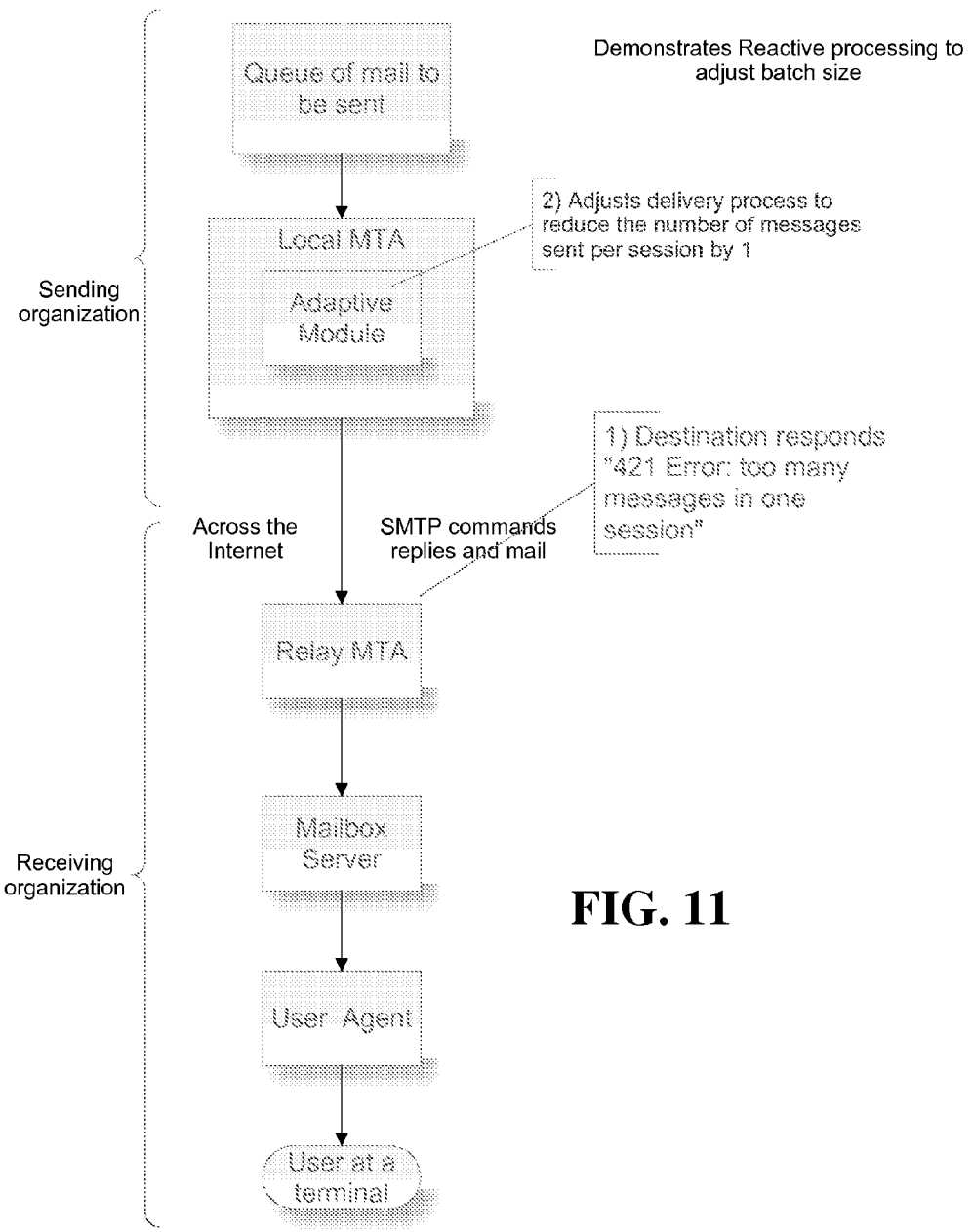
FIG. 11 is a flow chart illustrating reactive processing to adjust batch size in accordance with the present invention, and demonstrates the steps taken when too many messages are sent in one session.

If a sender tries to send "too many" messages in a given session, as illustrated in FIG. 11, the receiver may have a policy that sends back a response like the following: 421 Error: too many messages in one session.

The prior art in MTA technology will treat this as a regular transient failure and will continue to butt up against that policy. This can have long term harmful effects on the reputation of the sender, as the receiver may have policies in place that cause that sender to be placed on an internal block list if the behavior persists. There is also the increased cost to the sender of having to retry the messages again later.

Applicant's invention reduces the impact of this by the use of a rule (and additional similar rules can be defined by the local administrator) as shown in Table 1.

The "code" line matches the SMTP response cited above. The "phase" line scopes this particular rule to the phase of the SMTP dialog where a new batch of mail is being initiated via the "MAIL FROM" command. The "action" line instructs the adaptive delivery module to reduce the maximum number of deliveries per session by 1, so that the next time that messages are delivered to that recipient, the sending system will initiate fewer batches before closing the session. If there is still mail queued after closing the session, the sending system will initiate a new connection/session (this sentence is prior art).

As illustrated in FIG. 12, If a sender tries to send "too many" messages over the course of some receiver policy specific time period, the receiver may decide to issue an SMTP response that looks like the following: 452 Too many recipients received this hour.

The prior art in MTA technology will treat this as a regular transient failure and will continue to butt up against that policy with the same implications and effects as described above.

Applicant's invention reduces the impact of this by the use of a rule (and additional similar rules can be defined by the local administrator) as shown in Table 1.

The "code" line matches the SMTP response cited above. The "phase" line scopes this particular rule so that it is only evaluated during connection establishment. The "action" line specifies that the sending system should adjust its message-sending throttle downwards. In Applicant's present implementation, each invocation of the "throttle down" action causes a 10% reduction in the throttle setting. Since the response contains no indication of the preferred reception rate, it may take a few occurrences of this response to cause the throttle to fall to a level that is acceptable to the receiver.

Figure 13:
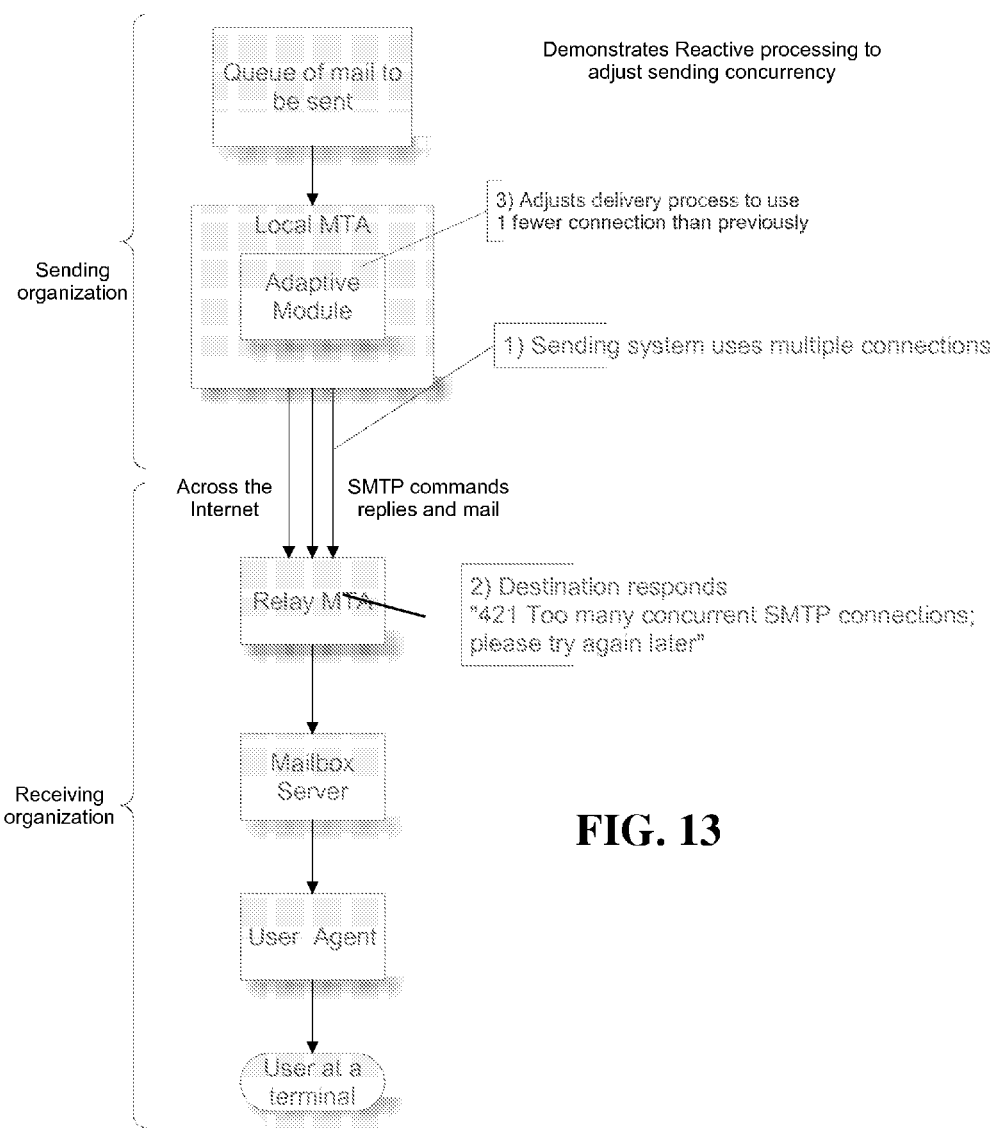
FIG. 13 is a flow chart illustrating reactive processing to adjust sending concurrency in accordance with the present invention, and demonstrates the steps taken when the sender has established too many connections to the receiver.

Another traffic shaping metric that is used by receivers is the number of connections established to the receiver from the sender, as illustrated in FIG. 13. The rationale is that a high number of connections may indicate abusive behavior. If a sender exceeds this limit (and the limit is something that is entirely covered by the receiver policies, and may even be dependent upon the connecting IP address), then they may encounter a response along the lines of the following: 421 too many concurrent SMTP connections; please try again later.

The prior art in MTA technology will treat this in the same way as regular transient failures as described above, with all the same ramifications.

Applicant's invention deals with this with the use of rules similar to that shown in Table 1.

The important part of this rule is the "action" line, which reduces the number of allowed concurrent connections to the receiver by 1. As with the other similar rules above, it may take a number of occurrences of this response to tune the effective value to be within tolerable limits of the specific receiver.

Another scenario is that a receiver may decide, based on unusual sending behavior, establish a dynamic block and issue a permanent failure response to all messages originating from your address for a certain fixed time period. An example response might be as follows, although this particular item has identifying information replaced with a generic example URL: 554 RLY:B1 dynamic block http://example.com/rlyb1.html.

Figure 14:
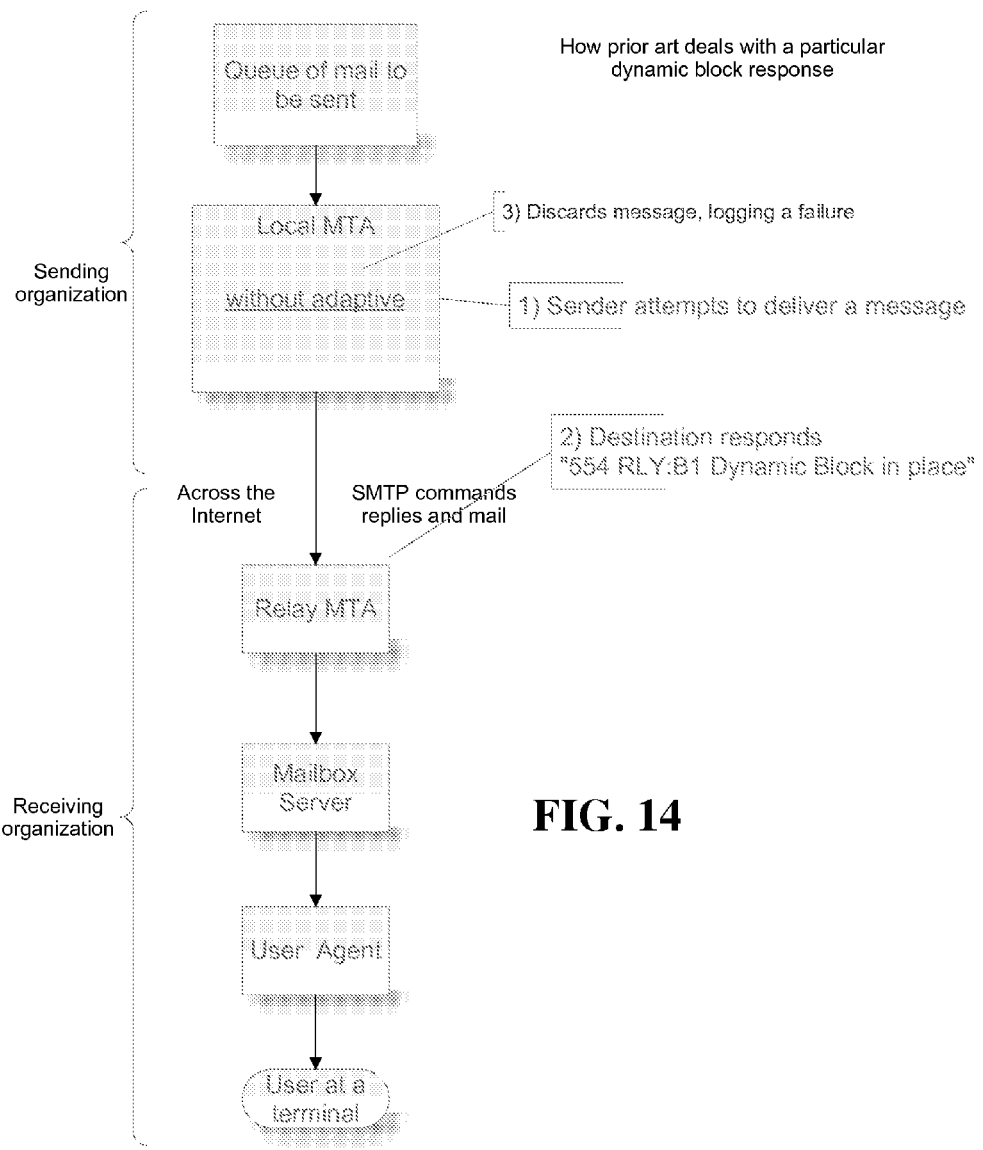
FIG. 14 is a flow chart illustrating the steps taken to respond to a particular dynamic block response, in accordance with Prior Art.

As shown in FIG. 14, the impact that this has on prior-art MTAs is that they will fail all messages that they attempt to send to that destination while the block is in effect. In reality, this particular classification is transient (the actual URL in the real-life response details that the block will expire after 24 hours), which means the subsequently injected (with respect to the block being established) messages will be failed out-of-hand, even though they may be radically different from the content of the messages that triggered the block.

Figure 15:
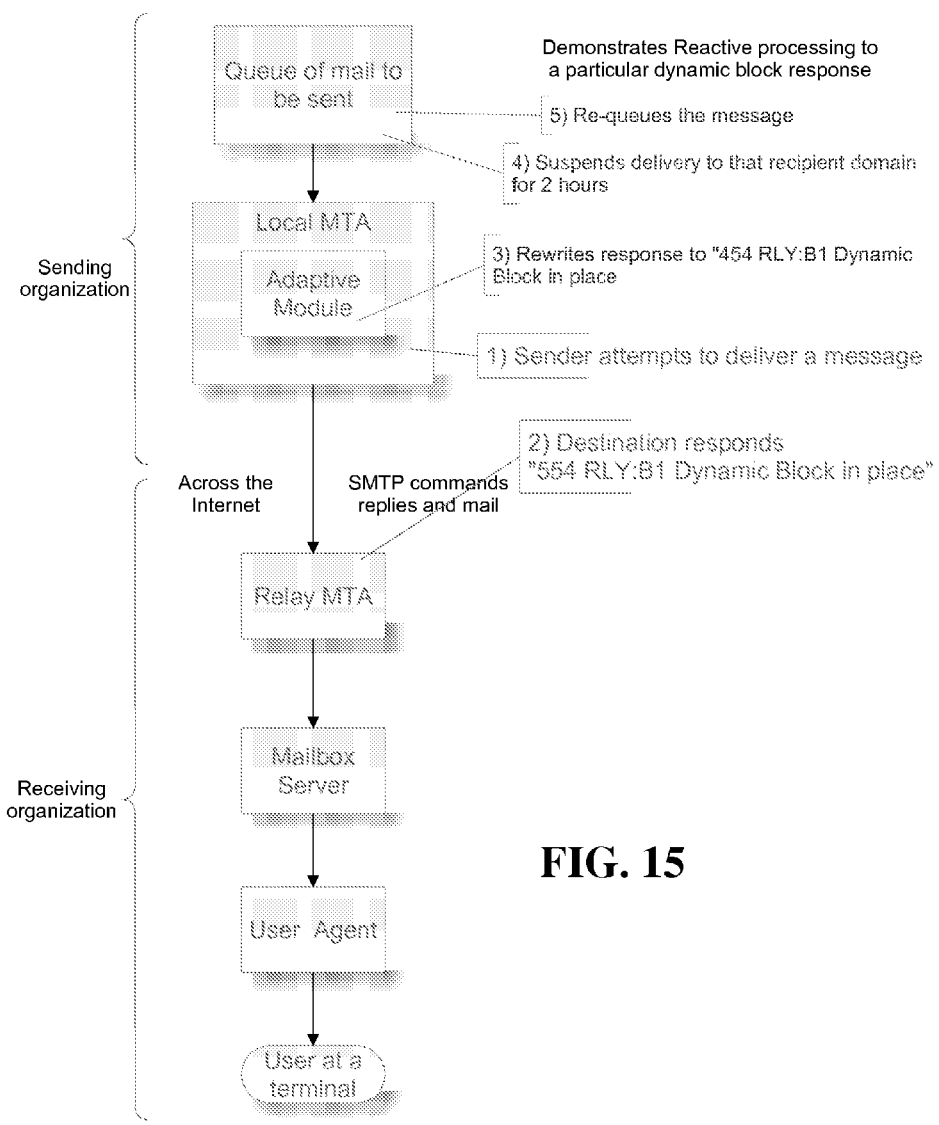
FIG. 15 is a flow chart illustrating reactive processing to a particular dynamic block response in accordance with the present invention, and relates to the process illustrated in FIG. 14 to indicate changes in the delivery flow in the present invention.

Applicant's invention, as illustrated in FIG. 15, allows the response to be transcoded from a permanent to a transient failure (or vice-versa) using a rule like that shown in Table 1 (and as usual, additional rules may be defined by the local administrator).

In this case, the "action" specifies that two actions be carried out: 1) rewrite the response code from 554 to 454, converting it from a permanent to a transient response, causing the message that encountered the error to be retried later. 2) enact a suspension lasting 2 hours.

This has the effect of requeuing the messages in a reasonably efficient manner; rather than retrying per the usual retry schedule, the messages will remain in the queue for the next 2 hours; once the suspension is lifted, the messages will be attempted again. If they encounter the same response, they will be transiently failed and a suspension triggered again.

Some receivers maintain data on the historical sending rate of particular sending IP addresses. Their policies place limits on the allowed reception rate of the IP based on the establishment of a good reputation over time. If they have never seen a particular IP address before, they will use fairly restrictive settings on the allowed reception rate, and issue transient failures if these rates are exceeded. As the receiver becomes more familiar with the sender, based on the overall message volume and length of time that the system has been sending, they will increase the permitted reception rate. This concept is known as "IP Warmup" in the industry.

The prior-art MTAs have no mechanism to adapt to this type of time based rate control, requiring explicit configuration changes to adapt. Applicant's invention improves on this in two ways.

The first of these is being able to configure a parametric rate for the receivers that are known to have these policies. An example parametric throttle rate is shown below:

```
outbound_throttle_messages=
    function(last,curr,age,mc)
```

100/hr for 4 days,
raise to 1000/hr for next 5 days
age=age/86400;—convert to age in days
if age <=4 then return 100; end if age <=10 then return 1000;
end return 0; end, This is expressed as a function in the "Lua" language. The parameters to the function are:

Curr—the current value for the outbound message throttle rate, which may include a speculative adjustment Last—the value for outbound message throttle rate that was used up until this point Age—the locally recorded age of the IP address Mc—the locally recorded message volume sent from this IP address to the receiver in question As the comment in the function indicates, this particular setting causes the throttle rate to be set to 100 messages per hour for the first 4 days that the IP address is used, upscaling to 1000 messages per hour for the next 5 days, and then removes the throttle after that time period.

The age of the IP address is assumed to be 0 when the system is first provisioned, but this can be explicitly set by the local administrator. Similarly for the "mc" parameter (the message volume), although in Applicant's current embodiment, Applicant doesn't track the message volume and have no rules that use it.

Figure 16:
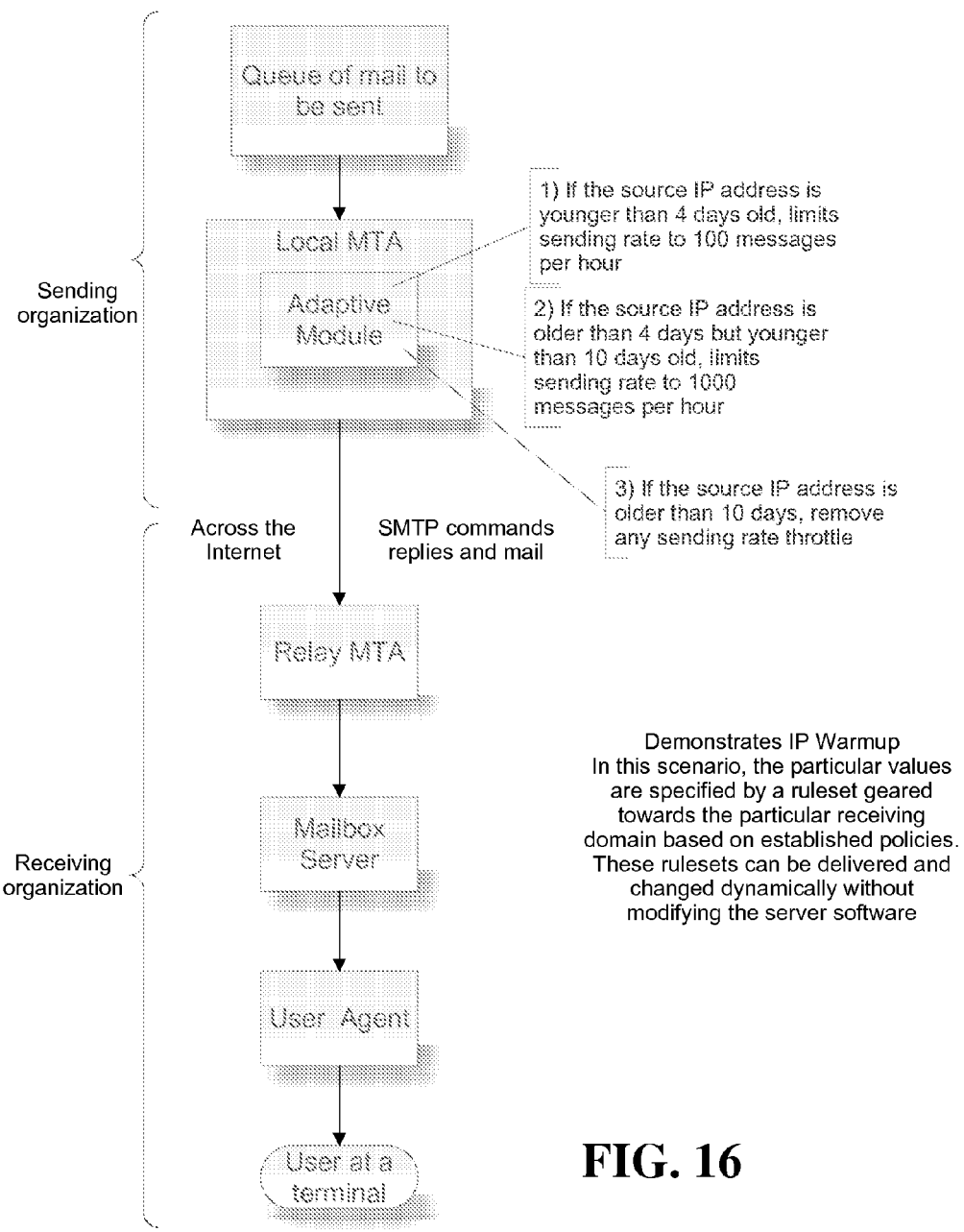
FIG. 16 is a flow chart illustrating IP Warmup in accordance with the present invention, and demonstrates some of the responses by the adaptive module based on the age of the source IP address.

The other facet of Applicant's invention that improves on the prior art in the face of "IP Warmup" receiving policies is the ability to dynamically react to responses that indicate that Applicant should do so, as shown in FIG. 16. For instance, if a given IP address with an established reputation reduces its sending rate to zero for an extended period of time, a receiver may decide to reset it so that it has an infant status.

If the sender were then to ramp up their sending to the levels that were possible with the prior reputation, they may run into a response like this: 412 RP-001 the mail server IP has exceeded the rate limit.

This response can also arrive if the complaint volume for the sending raises too high and triggers an automated temporary block.

Figure 17:
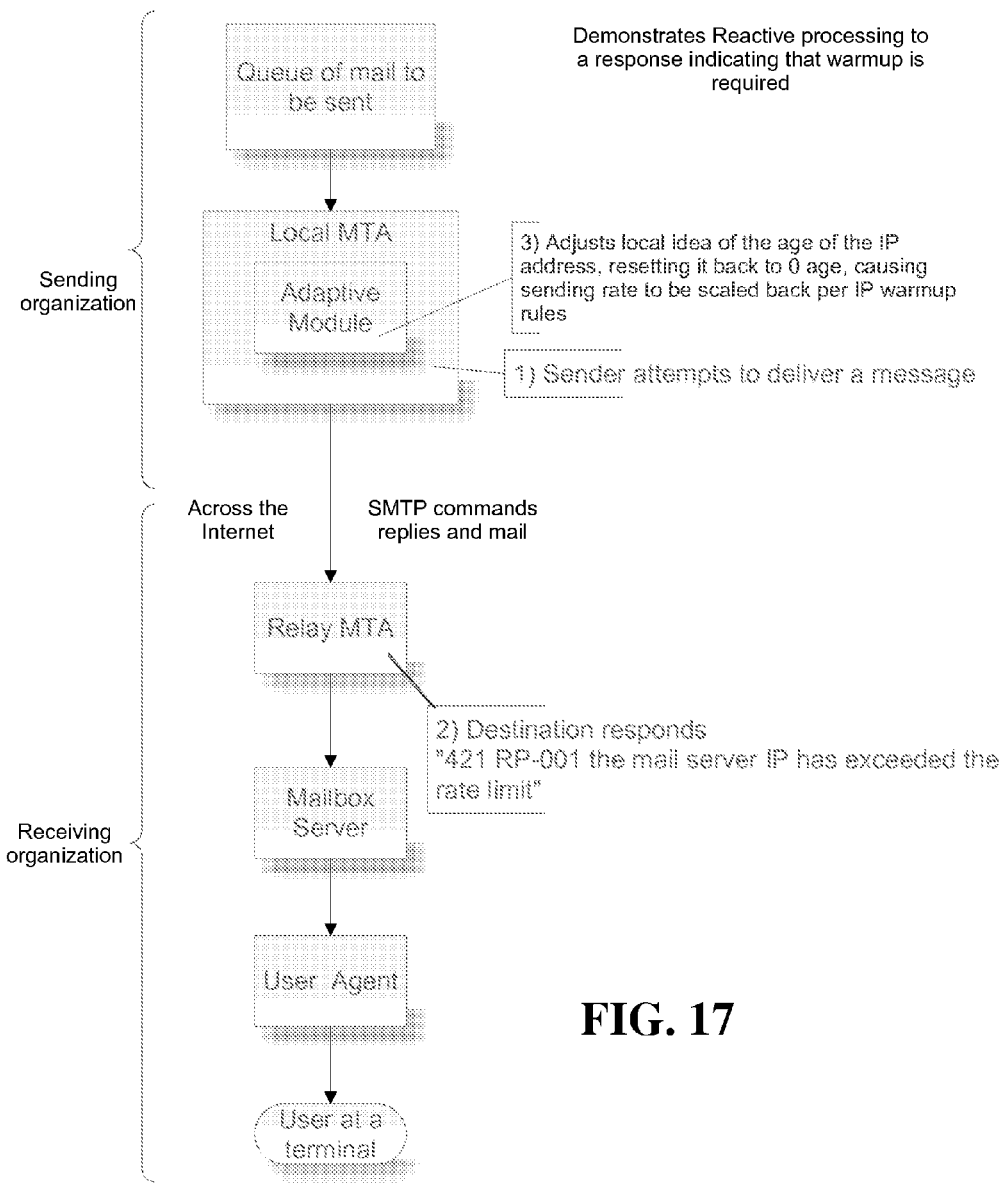
FIG. 17 is a flow chart illustrating reactive processing to a response indicating that warmup is required in accordance with the present inventions, and shows the steps that are taken when the mail server IP has exceeded the rate limit.

In both cases, the recommended practice is to re-warm the sending IP address, as illustrated in FIG. 17. The prior-art MTAs have no capability to do this, effectively suspending their outbound mail flow to that particular destination, but through the use of rules like that shown in Table 1 (which can also be set by the local administrator), Applicant's invention allows mail to flow once again, albeit at a lower, more acceptable rate.

The "warmup" action causes the recorded age of the IP address in question to be reset, starting causing the parametric throttle rate to select a lower value.

Periodic Parameter Adjustment:

A lot of the techniques above are used to adjust the traffic shaping parameters downwards in response to events that indicate that the rates should be reduced.

While this is an effective means to automatically reduce rates, there also needs to be a mechanism that works in the opposite direction to increase rates if it seems like it would help.

The prior art in this area is not automated; the local administrator must manually adjust the shaping parameters to suit the changing needs of their system.

The adaptive delivery invention employs a simple heuristic in its current embodiment; when evaluating the value of a traffic shaping parameter (such as the number of concurrent connections, or the rate at which messages should be sent), if the system has not made a negative adjustment within a configurable time period (default 1 hour), then the system will speculatively increase the value of the parameter by 1.

This allows the system to gradually open up the sending rate, without manual intervention, after it has been calmed by one of the techniques described in the preceding pages.

Periodic Aggregate Disposition Checks:

The majority of the functionality described in the preceding pages talks about reactions to specific responses encountered by the system when attempting to deliver to a recipient. The protocol indicates that these responses are primarily geared towards information the sender of the status of the reception of a given message payload, although it is possible that the recipient will send back more of a blanket response during the connection phase if they have opted to establish a mail block.

Having a system based purely on individual message disposition results is not sufficient for managing a good sending reputation (and thus having an optimal sending rate); if the messages are being rejected at a higher than usual (or otherwise acceptable) rate by the receiver, it is indicative of a problem that can require intervention to preserve the sender reputation. For instance, perhaps a typo was made in some message content causing it to be offensive, or perhaps an overly aggressive marketing campaign looks more like spam mail than it should, or in the case of Email Service Providers (organizations that provide outsourced email sending capabilities for others), a customer violates terms of service and deliberately sends spam mail.

In these cases, the complaint or rejection rate will be unusually high and indicates that a mail block is likely to be enacted if the behavior continues. The prior-art message relaying technology does not have any automated mechanisms to manage this. Most sending institutions have set up business level monitors that alert an operator to take manual action. Applicant's invention improves on this situation by automatically taking actions and sending alerts.

Figure 18:
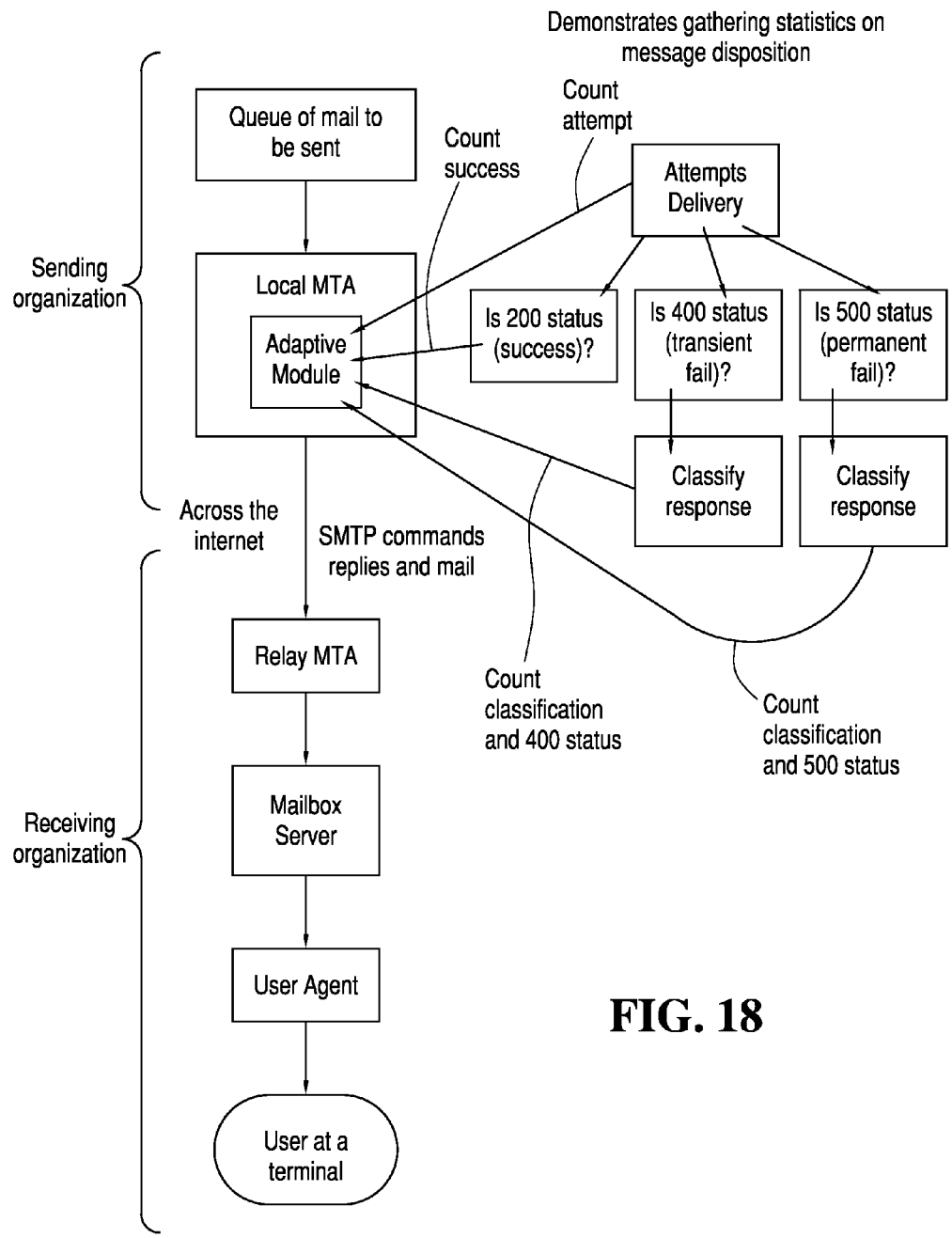
FIG. 18 is a flow chart illustrating statistics based on message disposition in accordance with the present invention, and shows the steps that are taken in gathering the statistics when delivery is attempted.

As shown in FIG. 18, Applicant's solution records the volumes of messages that were attempted, succeeded and failed for each source IP to each recipient domain.

Applicant also recognizes that the reason why a receiver rejects a given message can be fairly nuanced. Applicant's solution, like some others (so this paragraph is effectively prior art and not a claim) classifies SMTP responses and out-of-band bounce reports into one of a number of reasons.

Broadly speaking, "bounce classification" is not suitable to solve the problems solved by the system and method of the present invention, instead, applicants' system records the volume of each of the bounce classifications over time and may then act in response to this as part of periodic aggregate disposition checks.

Figure 19:
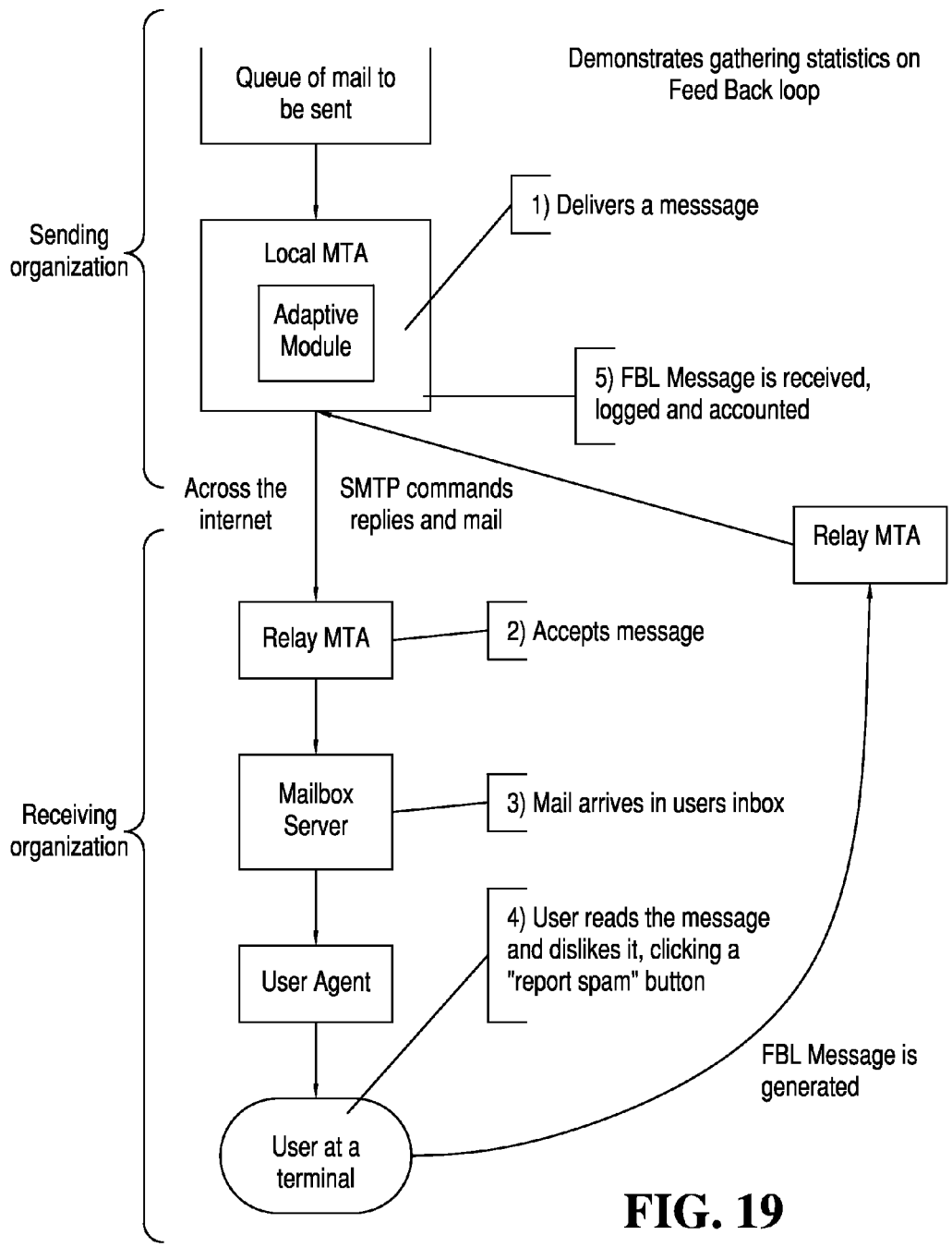
FIG. 19 is a flow chart illustrating statistics on Feed Back Loop in accordance with the present invention, and shows the steps taken in gathering the statistics when reported by the end-user.

In addition, Applicant's software also records the volumes of Feed-Back Loop (FBL) complaints that are sent back to the system from the major receivers, as illustrated in FIG. 19. The FBL is a standard mechanism for relaying information about user complaints from the major ISPs. These are implemented via a "report spam" or similar button in the end-user email software. When a user complains, the ISP records this, and if the sender has arranged to be a part of the FBL with that receiver, a special FBL report email is sent back to the sender. The concept with the FBL is that the sender will take steps to remedy the complaint in short order, with the typical resolution being that the recipient should be unsubscribed or otherwise taking steps to avoid sending content to that recipient again.

FBL complaints are sensitive, with the major ISPs likely to enact a block against a sender if the complaint rate rises to something in the range of 0.5% to 1% of the volume of messages from that sender.

FBL complaints can be categorized into one of the following: abuse, fraud, invalid dkim signature, virus and other. So, in accordance with the present invention, a periodic aggregate disposition is evaluated.

For a simple example, say an administrator wants to suspend deliveries if 10% or more of message traffic is being rejected by a given recipient. However, the threshold needs to be statistically significant; if a sender sends one message and it is rejected immediately, the rejection rate is effectively 100% at that point. So, in accordance with the present invention, a parameter is provided that allows the administrator to specify the minimum amount of messages that need to have been attempted before this processing can take effect. An example default for this threshold parameter is 100 messages.

The system of the present invention processes the periodic aggregate disposition checks every hour (configurable) and provides a number of different rules (that can be configured by the local administrator) to control the behavior.

Figure 20:
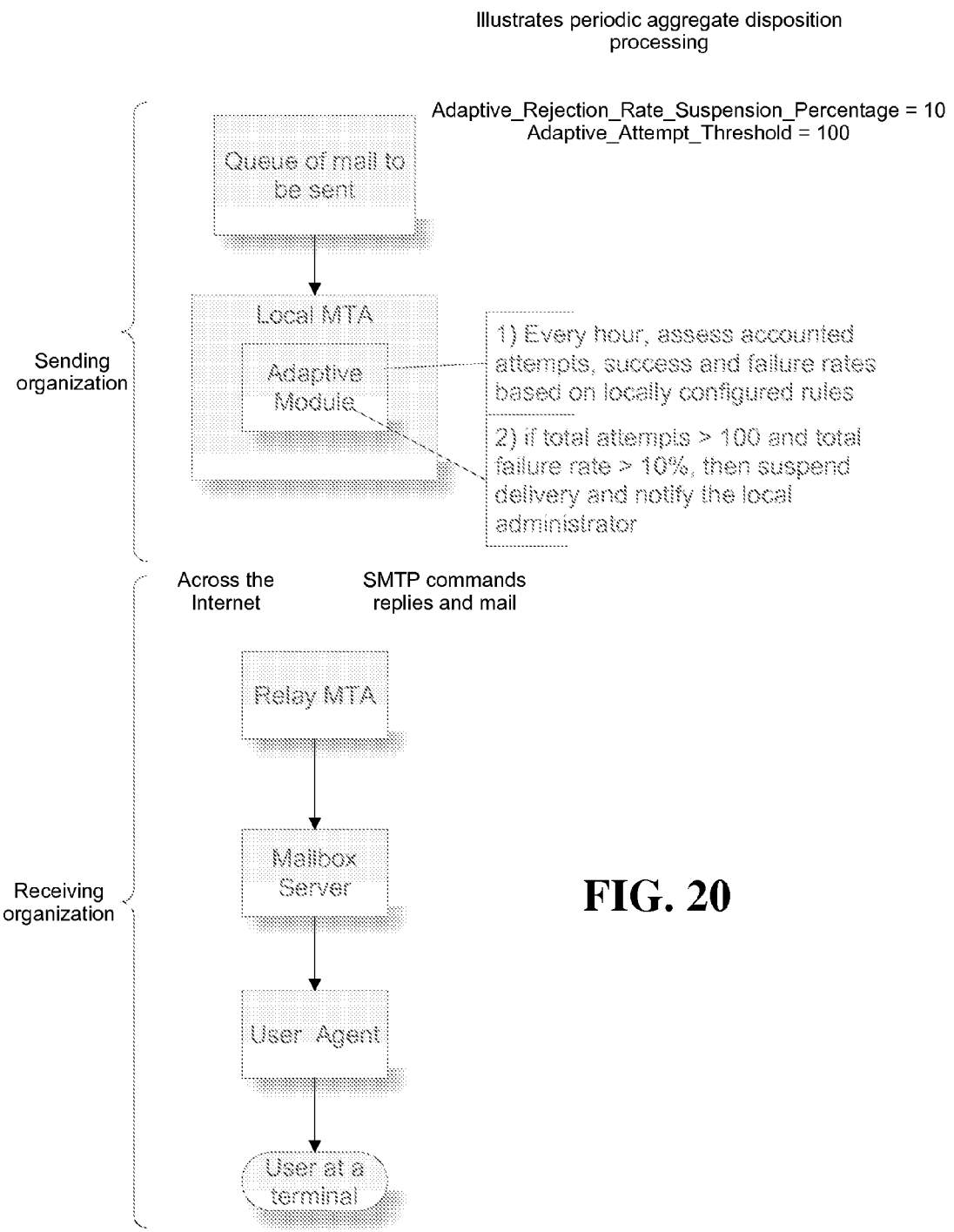
FIG. 20 is a flow chart illustrating periodic aggregate disposition processing in accordance with the present invention, and demonstrates the behavior that results in a specific scenario.

For example, as shown in FIG. 20, the illustrated configuration causes a suspension to be enacted when the total rejection rate, based on the protocol level responses, reaches 10%, but only if at least 100 messages have been attempted:

Adaptive_Rejection_Rate_Suspension_Percentage=10

Adaptive_Attempt_Threshold=100

For more granularity, rules such as the following can be specified:

---
Codes = ( "bc:10" "bc:23" "bc:22" ) # correspond to bounce codes table above
Low_Action =( "throttle" "down" )   Low_Threshold = 3
       High_Action = ( "suspend" "4 hours" )   High_Threshold = 10
---

This rule states that if the total volume of rejections classified as an invalid recipient, mailbox full or message too large reaches 10%, then the message flow to that recipient domain will be suspended. Otherwise, if the rate reaches 3% then the system will reduce the sending rate by 10% (per the description of throttle down earlier in this document).

The actions that can be specified here are the same as those described in the earlier part of this document.

The list of codes can be chosen by local administrator and the rules can themselves be specified on a per recipient domain per sending IP basis.

An example of using the FBL data:

---
Codes = ( "fbl:abuse" )              Low_Threshold = 0.3
Low_Action = ( "throttle down" )     High_Threshold = 0.5
       High_Action = ("suspend" "4 hours")
---

This rule has the effect of reducing the sending rate once the FBL abuse complaint rate reaches or exceeds 0.3%, and suspending the sending if it reaches 0.5%.

Since these rules are assessed every hour (configurable), the Low Threshold may trigger multiple times, having a stronger calming effect over time.

Applicant's invention records the bounce classification and overall volume statistics windowed to a 1 hour interval (configurable), which has the effect of automatically causing the statistics to fall below the triggering threshold over time. Applicant's invention records the FBL data over a longer time period of 24 hours (configurable) since the low trigger threshold and established practices of the receivers require this in order for the solution to be effective.

Having described preferred embodiments of a new and improved method and system 200, it is believed that other modifications, variations and changes will be suggested to those skilled in the art in view of the teachings set forth herein. It is therefore to be understood that all such variations, modifications and changes are believed to fall within the scope of the present invention. For example, it is considered obvious that the method and system described herein can also be claimed as a computer program comprising a computer readable, non-transitory storage medium and instructions thereon for delivering a plurality of digital messages by utilizing the method and systems described herein.

TABLE 1

| Rule Name | Code | Trigger | Action | Message Notification | Phase |
|---|---|---|---|---|---|
| (a) Example of Rules In a Typical Rule-set | | | | | |
| Transcode | 421 4\\.7\\.1 \\[TSO3\\] All messages from (?<IPADDRESS>\\d+\\.\\d+\\.\\d+\\.\\d+) will be permanently deferred" | 1 | transcode", "554", "blackhole", "4 hours"} | "Remediation with ____ required", | connect |
| Suspension | 421 4\\.7\\.0 \\[TSO2\\] Messages from (?<IPADDRESS>\\d+\\.\\d+\\.\\d+\\.\\d+) | 5/1 | {"suspend", "4 hours"}, | | connect |

TABLE 1-continued

| Rule Name | Code | Trigger | Action | Message Notification | Phase |
|---|---|---|---|---|---|
| | temporarily deferred due to user complaints-4\\.16\\.56" | | | | |
| Warmup | 421 PR\\(dt1\\) *The mail server IP connecting to Windows Live Hotmail server has exceeded the rate limit allowed on this connection. | 1 | {"warmup", "1"}, | | connect |
| (b) Example of Rules In a Typical Rule-set ||||||
| Greylist | "(?i)grey ?list"; | 1 | {"greylisted", "15 minutes"} | | "rcptto |
| Reputation In Jeopardy | 421 4\\.7\\.0 \\[TS01\\] Messages from (?<IPADDRESS>\\d+\\.\\d+\\.\\d+\\.\\d+) temporarily deferred due to user complaints-4\\.16\\.55\\.1", | 1 | {"suspend", "4 hours"}, | | connect |
| Remediation Required | 421 4\\.7\\.1 \\[TS03\\] All messages from (?<IPADDRESS>\\d+\\.\\d+\\.\\d+\\.\\d+) will be permanently deferred" | 1 | {"suspend", "4 hours"}, | "Remediation with Operator Name required", | connect |
| Blackhole | 421 4\\.7\\.1 \\[TS03\\] All messages from (?<IPADDRESS>\\d+\\.\\d+\\.\\d+\\.\\d+) will be permanently deferred" | 1 | {"blackhole", "4 hours"} | Remediation with Operator Name required" | connect |
| Too Many Messages Per Session | 421 Error: too many messages in one session" | 1 | {"throttle", "down"}, | | mailfrom |
| (c) Example of Rules In a Typical Rule-set ||||||
| Too Many Recipients Per Hour | 452 .*Too many recipients received this hour" | 1 | | | connect |
| Connection Problem | 421 Too many concurrent SMTP connections; please try again later" | 1 | {"reduce_connections", } | | connect |
| Dynamic Block | 554 RLY:B1" | 1 | {"transcode", "454", "suspend", "2 hours"}, | Dynamic block in place" | connect |
| IP Warmup | "421 RP-00[123]", | 1 | {"warmup", "1"}, | | connect |

We claim:

1. An improved method for delivering a plurality of digital messages to recipients at a plurality of recipient domains, said method of the type that is used by a systems administrator and includes the steps of:

(i) utilizing a plurality of operating techniques for sending said digital messages to each of said recipient domains, (ii) receiving and storing message delivery disposition information from said recipient domains for each of said digital messages received by one of said recipient domains, (iii) establishing a set of rules for yielding evaluations over a specified monitoring period for said message delivery disposition information, wherein said rules pertaining to parameters that include the rate of connection attempts made, time-out notifications received, spam block notifications received or delivery failure notifications received per said specified monitoring period, (iv) establishing reactive actions, in response to said evaluations over a specified period of time of said message delivery disposition information, to be taken to modify said operating techniques so as to maintain a targeted success rate for the delivery of said digital messages, wherein said actions include aborting, postponing, deferring and discontinuing said delivery of said digital messages, and (v) implementing, at the conclusion of one of said specified periods of time, said responsive actions in response to said evaluations over a specified period of time of said message delivery disposition information, the improvements to said method, which allow for an increase in said targeted success rate for the delivery of said digital messages, comprising the steps of:

making real-time, at the instant said message delivery disposition information is received, multi-part assessments of said message delivery disposition information received from said recipient domains so as to determine in real-time whether a change in the operating techniques of said method is needed in order to ensure the continuation of a high success rate for the delivery of said digital messages, establishing a plurality of real-time, updating actions to change in real-time said operating techniques of said method, and wherein each of said real-time, updating actions corresponding to one of said parts of said real-time, multi-part assessments of said message delivery disposition information, and automatically, by utilizing a part of said real-time, multi-part assessments, implementing in real-time one of said plurality of real-time, updating actions so as to allow for an increase in said targeted success rate for the delivery of said digital messages.

2. The improved method for delivering a plurality of digital messages as recited in claim 1, wherein:

said real-time, multi-part assessments utilize a Rule-set.

3. The improved method for delivering a plurality of digital messages as recited in claim 2, wherein:

said Rule-set includes a regular expression pattern matching tool.

4. The improved method for delivering a plurality of digital messages as recited in claim 3, wherein:

said Rule-set further include a phase metric and a trigger.

5. The improved method for delivering a plurality of digital messages as recited in claim 1, wherein:

said updating actions chosen from the group herein defined as a transcode, purge, suspend, blackhole, throttle, warmup, greylist, reduce connections, and reduce deliveries action.

6. The improved method for delivering a plurality of digital messages as recited in claim 2, wherein:

said updating actions chosen from the group herein defined as a transcode, purge, suspend, blackhole, throttle, warmup, greylist, reduce connections, and reduce deliveries action.

7. The improved method for delivering a plurality of digital messages as recited in claim 3, wherein:

said updating actions chosen from the group herein defined as a transcode, purge, suspend, blackhole, throttle, warmup, greylist, reduce connections, and reduce deliveries action.

8. The improved method for delivering a plurality of digital messages as recited in claim 4, wherein:

said updating actions chosen from the group herein defined as a transcode, purge, suspend, blackhole, throttle, warmup, greylist, reduce connections, and reduce deliveries action.

9. The improved method for delivering a plurality of digital messages as recited in claim 1, further comprising the step of:

providing a message notification to said system administrator that alerts said administrator that one of said updating actions is being taken.

10. The improved method for delivering a plurality of digital messages as recited in claim 8, further comprising the steps of:

providing a message notification to said system administrator that alerts said administrator that one of said updating actions is being taken.

11. A method that is used by a systems administrator for delivering a plurality of digital messages to recipients at a plurality of recipient domains so that a targeted success rate for the delivery of said digital messages is maintained, said method comprising the steps of:

utilizing a plurality of operating techniques for sending said digital messages to each of said recipient domains, receiving message delivery disposition information from said recipient domains for each of said digital messages received by one of said recipient domains, making real-time, at the instant said message delivery disposition information is received, multi-part assessments of said message delivery disposition information so as to determine in real-time whether a change in the operating techniques of said method is needed in order to ensure the continuation of the achievement of said targeted success rate for the delivery of said digital messages, establishing a plurality of real-time, updating actions to change in real-time said operating techniques of said method, and wherein each of said real-time, updating actions corresponding to one of said parts of said real-time, multi-part assessments of said message delivery disposition information, and automatically, by utilizing a part of said real-time, multi-part assessments, implementing in real-time one of said plurality of real-time, updating actions.

12. The method for delivering a plurality of digital messages as recited in claim 11, wherein:

said real-time, multi-part assessments utilize a Rule-set.

13. The method for delivering a plurality of digital messages as recited in claim 12, wherein:

said Rule-set includes a regular expression pattern matching tool, a phase metric and a trigger.

14. The method for delivering a plurality of digital messages as recited in claim 11, wherein:
said updating actions chosen from the group herein defined as a transcode, purge, suspend, blackhole, throttle, warmup, greylist, reduce connections, and reduce deliveries action.

15. The method for delivering a plurality of digital messages as recited in claim 13, wherein:
said updating actions chosen from the group herein defined as a transcode, purge, suspend, blackhole, throttle, warmup, greylist, reduce connections, and reduce deliveries action.

16. A computer program product for use in conjunction with a computer system, the computer program product comprising a computer readable, non-transitory storage medium and instructions thereon for delivering a plurality of digital messages to recipients at a plurality of recipient domains so that a targeted success rate for the delivery of said digital messages is maintained, said instructions comprising the steps of:
utilizing a plurality of operating techniques for sending said digital messages to each of said recipient domains,
receiving message delivery disposition information from said recipient domains for each of said digital messages received by one of said recipient domains,
making real-time, at the instant said message delivery disposition information is received, multi-part assessments of said message delivery disposition information so as to determine in real-time whether a change in the operating techniques of said method is needed in order to ensure the continuation of the achievement of said targeted success rate for the delivery of said digital messages,
establishing a plurality of real-time, updating actions to change in real-time said operating techniques of said method, and wherein each of said real-time, updating actions corresponding to one of said parts of said real-time, multi-part assessments of said message delivery disposition information, and
automatically, by utilizing a part of said real-time, multi-part assessments, implementing in real-time one of said plurality of real-time, updating actions.

17. The computer program product for use in conjunction with a computer system as recited in claim 16, wherein:
said real-time, multi-part assessments utilize a Rule-set.

18. The computer program product for use in conjunction with a computer system as recited in claim 17, wherein:
said Rule-set includes a regular expression pattern matching tool, a phase metric and a trigger.

19. The computer program product for use in conjunction with a computer system as recited in claim 16, wherein:
said updating actions chosen from the group herein defined as a transcode, purge, suspend, blackhole, throttle, warmup, greylist, reduce connections, and reduce deliveries action.

20. The computer program product for use in conjunction with a computer system as recited in claim 18, wherein:
said updating actions chosen from the group herein defined as a transcode, purge, suspend, blackhole, throttle, warmup, greylist, reduce connections, and reduce deliveries action.

* * * * *